United States Patent
Sudo

(10) Patent No.: US 9,182,907 B2
(45) Date of Patent: Nov. 10, 2015

(54) CHARACTER INPUT DEVICE

(75) Inventor: Tomohiro Sudo, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 206 days.

(21) Appl. No.: 13/637,809

(22) PCT Filed: Apr. 8, 2011

(86) PCT No.: PCT/JP2011/058943
§ 371 (c)(1),
(2), (4) Date: Sep. 27, 2012

(87) PCT Pub. No.: WO2011/126122
PCT Pub. Date: Oct. 13, 2011

(65) Prior Publication Data
US 2013/0021286 A1    Jan. 24, 2013

(30) Foreign Application Priority Data

Apr. 8, 2010  (JP) ................................. 2010-089715

(51) Int. Cl.
*G06F 3/041* (2006.01)
*G06F 3/0488* (2013.01)
(Continued)

(52) U.S. Cl.
CPC ............ *G06F 3/04883* (2013.01); *G06F 3/018* (2013.01); *G06F 3/0237* (2013.01); *G06F 3/04886* (2013.01)

(58) Field of Classification Search
CPC ......... G06F 3/041; G06F 3/048; G06F 3/023; G06F 3/018; G06F 3/04883; G06F 3/0237

USPC .......................................... 345/168, 169, 173
See application file for complete search history.

(56) References Cited

U.S. PATENT DOCUMENTS 7,250,938 B2    7/2007 Kirkland et al.
7,453,439 B1 *  11/2008 Kushler et al. ................ 345/168
(Continued)

FOREIGN PATENT DOCUMENTS

JP    8292944 A    11/1996
JP    2003141448 A    5/2003
(Continued)

OTHER PUBLICATIONS

International Search Report and Written Opinion corresponding to PCT/JP2011/058943, dated Jun. 28, 2011.
(Continued)

*Primary Examiner* — Towfiq Elahi
(74) *Attorney, Agent, or Firm* — Hauptman Ham, LLP

(57) ABSTRACT

A mobile phone terminal includes a touch panel that detects a gesture with respect to a display surface thereof, and a control unit that displays a plurality of buttons on the display surface of the touch panel. When the touch panel detects a gesture in which touch is started at a first position on the touch panel and is maintained to a second position on the touch panel, the control unit displays a character string obtained by prediction processing or conversion processing based on a character string including characters corresponding to buttons displayed on a trajectory obtained by connecting each position in which the touch is detected from when the touch is started at the first position to when the touch is maintained to the second position in a predetermined area on the touch panel as a candidate of a character string input by the gesture.

8 Claims, 20 Drawing Sheets

(51) Int. Cl.
*G06F 3/01* (2006.01)
*G06F 3/023* (2006.01)

(56) References Cited

U.S. PATENT DOCUMENTS

| | | | |
|---|---|---|---|
| 2005/0052406 A1* | 3/2005 | Stephanick et al. | 345/156 |
| 2007/0273648 A1* | 11/2007 | Fussinger | 345/161 |
| 2009/0058690 A1* | 3/2009 | Scott | 341/23 |
| 2009/0296988 A1* | 12/2009 | Yamazaki et al. | 382/103 |
| 2010/0095205 A1 | 4/2010 | Kinoshita | |
| 2010/0225599 A1* | 9/2010 | Danielsson et al. | 345/173 |
| 2012/0001922 A1* | 1/2012 | Escher et al. | 345/467 |

FOREIGN PATENT DOCUMENTS

| | | |
|---|---|---|
| JP | 2004295578 A | 10/2004 |
| JP | 2005196759 A | 7/2005 |
| JP | 2007328795 A | 12/2007 |
| JP | 2008108233 A | 5/2008 |

OTHER PUBLICATIONS

Office Action mailed Apr. 1, 2014, corresponds to Japanese patent application No. 2010-089715, for which an explanation of relevance is attached.

* cited by examiner

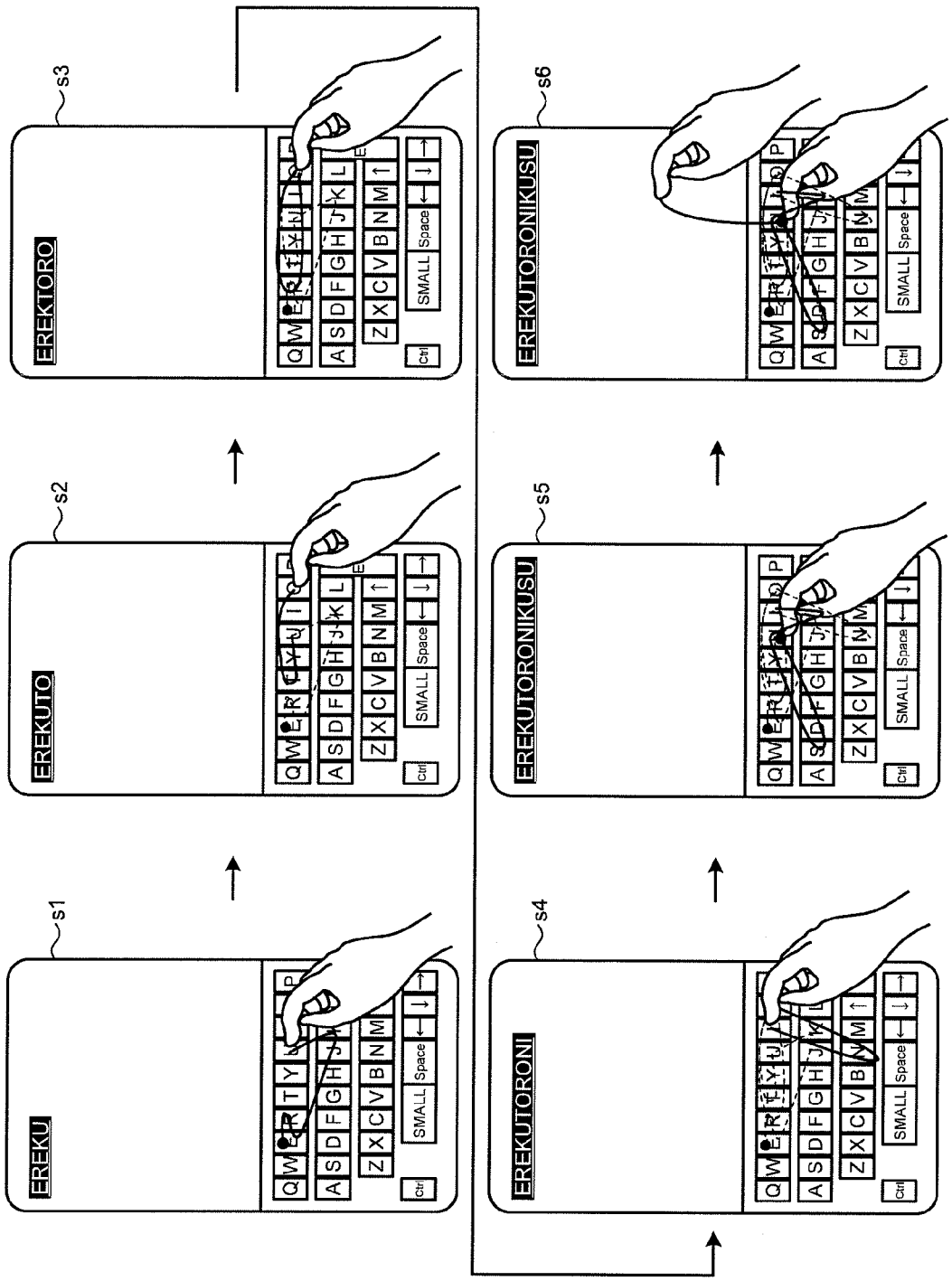

| CHARACTER | Q | W | E | ... |
|---|---|---|---|---|
| x | 10 | 32 | 54 | ... |
| y | 10 | 10 | 10 | ... |
| WIDTH | 20 | 20 | 20 | ... |
| HEIGHT | 40 | 40 | 40 | ... |

FIG.13

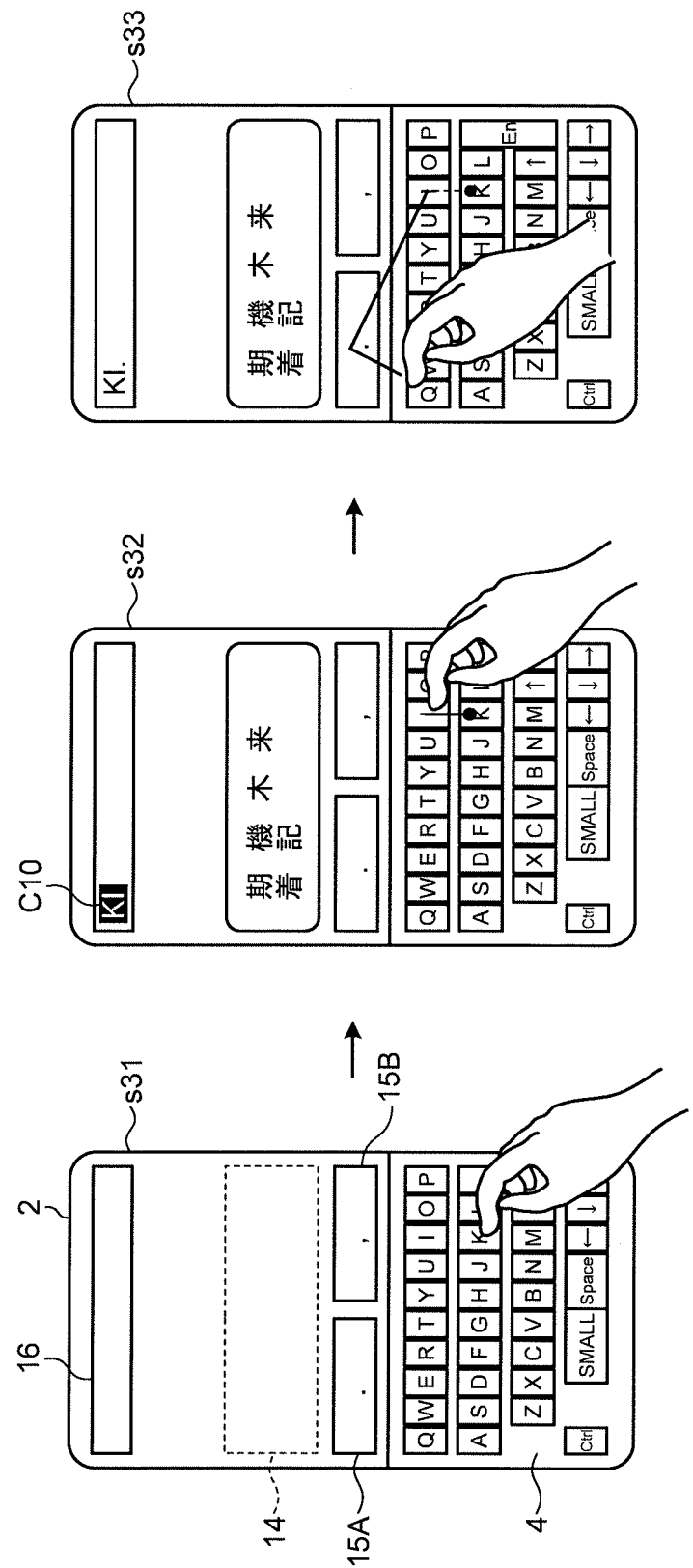

CHARACTER INPUT DEVICE

CROSS-REFERENCE TO RELATED APPLICATION

This application is a National Stage of PCT international application Ser. No. PCT/JP2011/058943 filed on Apr. 8, 2011 which designates the United States, and which is based upon and claims the benefit of priority from Japanese Patent Application No. 2010-089715, filed on Apr. 8, 2010.

TECHNICAL FIELD

The present invention relates to a character input device and a character input method.

BACKGROUND ART

In recent years, touch panels have been widely used in order to enable an intuitive operation and achieve a compact mobile electronic device without a device requiring a physically large area, such as a keyboard. As technologies for inputting a character by using a touch panel, a technology for inputting a character in handwriting on a touch panel (e.g., Patent Literature 1) and a technology for inputting a character by using a virtual keyboard (hereinafter, referred to as a "virtual keyboard") displayed on a touch panel (e.g., Patent Literature 2) are known.

CITATION LIST

Patent Literature

Patent literature 1: Japanese Patent Application Laid-open No. 2003-141448
Patent Literature 2: Japanese Patent Application Laid-open No. 2008-108233

DISCLOSURE OF INVENTION

Problem to be Solved by the Invention

However, the conventional technology for inputting a character in handwriting on a touch panel has a problem in that it is difficult to input a character at high speed because it takes time to input a character and recognize the character. Furthermore, the conventional technology for inputting a character by using a virtual keyboard has a problem in that it is difficult to input a character at high speed because a user needs to repeat a gesture of moving his or her finger up and down with respect to a touch panel for each key corresponding to a character desired to be input.

In view of the problems described above, it is an object of the present invention to provide a character input device and a character input method that make it possible to input a character on a touch panel at high speed.

SUMMARY OF THE INVENTION

According to an aspect, a character input device includes: a touch panel for detecting a touch gesture with respect to a display surface thereof; and a control unit for displaying a plurality of buttons on the display surface of the touch panel, and for displaying, when the touch panel detects a touch gesture in which a touch is started at a first position on the touch panel and is maintained to a second position on the touch panel, a character string in a predetermined area on the touch panel as a candidate of a character string input by the touch gesture. The character string displayed in the predetermined area is obtained by prediction processing or conversion processing based on a character string including characters corresponding to the buttons displayed on a trajectory obtained by connecting each position in which the touch is detected from when the touch is started at the first position to when the touch is maintained to the second position.

According to another aspect, the control unit is configured to receive, when the touch started at the first position and maintained to the second position is further maintained to the predetermined area, and when a specific gesture is detected in the predetermined area, the character string displayed at a position where the specific gesture is detected as the character string input by the gesture.

According to another aspect, the control unit is configured to receive the character string displayed at the position where a change in a direction of movement of the touch is detected in the predetermined area as the character string input by the touch gesture.

According to another aspect, the control unit is configured to receive the character string displayed at the position where a movement of the touch in which a trajectory of a specific shape is drawn is detected in the predetermined area as the character string input by the touch gesture.

According to another aspect, the control unit is configured to convert the character string including the characters corresponding to the buttons displayed on the trajectory into kanji by the conversion processing.

According to another aspect, the control unit is configured to receive, when the touch started at the first position and maintained to the second position is further maintained to a mark area of the touch panel specified in advance, and when the specific gesture is detected in the mark area, one of character strings obtained by the prediction processing or the conversion processing as the character string input by the touch gesture and further receive a mark corresponding to the mark area as a character thus input.

EFFECT OF THE INVENTION

The character input device and the character input method according to the present invention make it possible to input a character on a touch panel at high speed.

BRIEF DESCRIPTION OF DRAWINGS

FIG. 6 is a diagram illustrating an exemplary operation of character input.

FIG. 10 is a diagram illustrating an example of virtual keyboard data.

FIG. 13 is a diagram illustrating an example of an input character buffer.

FIG. 19 is a diagram illustrating an example of processing for determining a candidate when a mark is received.

DESCRIPTION OF EMBODIMENTS

Exemplary embodiments according to the present invention will be described below in greater detail with reference to the accompanying drawings. It is to be noted that the present invention is not limited by the following explanation. Components in the description below include components that can be assumed easily by those skilled in the art, and components that are substantially identical, that is, components within a so-called equivalent scope. In the description below, a mobile phone terminal will be explained as an example of a character input device. However, a target to which the present invention is applied is not limited to the mobile phone terminal. The present invention can also be applied to various types of devices including a touch panel, such as a personal handy-phone system (PHS), a personal digital assistant (PDA), a portable navigation device, a personal computer, and a game device.

Figure 1:
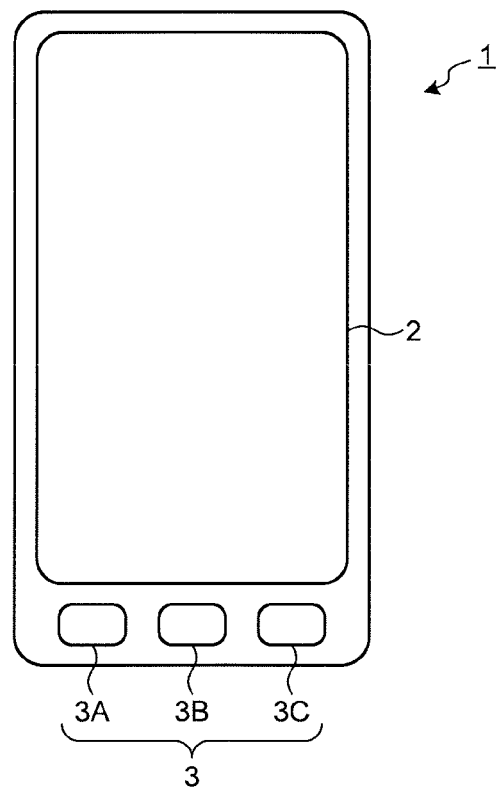
FIG. 1 is a front view of an appearance of a mobile phone terminal.

FIG. 1 is a front view of an appearance of a mobile phone terminal 1 according to an embodiment of the character input device of the present invention. The mobile phone terminal 1 includes a touch panel 2, and an input unit 3 composed of a button 3A, a button 3B, and a button 3C. The touch panel 2 displays a character, a figure, an image, and the like, and detects various types of gestures made with respect to the touch panel 2 using a finger, a stylus, a pen or the like (hereinafter, simply referred to as a "finger"). When any of the buttons are pressed, the input unit 3 activates a function corresponding to the button thus pressed.

Figure 2:
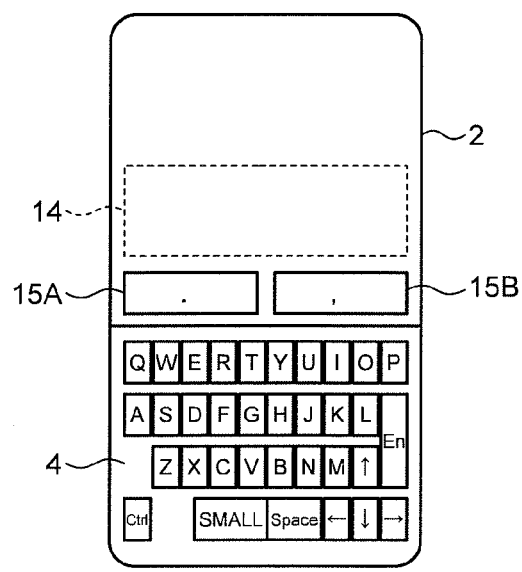
FIG. 2 is a diagram illustrating a virtual keyboard displayed on a touch panel.

In order to receive input of a character from a user, the mobile phone terminal 1 displays a virtual keyboard 4 on the touch panel 2 as illustrated in FIG. 2. As illustrated in FIG. 2, the touch panel 2 is provided with an input character string candidate display area 14, and mark areas 15A and 15B. In the input character string candidate display area 14, a character string predicted or converted based on a gesture made with respect to the virtual keyboard 4 is displayed as a candidate of an input character string. The mark areas 15A and 15B are used for inputting a mark such as a period and a comma. The mark areas 15A and 15B function as areas for inputting a mark (e.g., a punctuation mark) only while the virtual keyboard 4 is being displayed.

The mark areas 15A and 15B in a state functioning as the areas for inputting a mark may have appearances in which the ranges of the areas are made clear for the user by outer frames or background colors. Alternatively, the mark areas 15A and 15B may have transparent appearances such that the user can view the contents displayed in the areas by a computer program being executed. In the example illustrated in FIG. 2, a period ("." or a corresponding Japanese kanji letter) is displayed in the mark area 15A, and a comma ("," or a corresponding Japanese kanji letter) is displayed in the mark area 15B. In this manner, a mark corresponding to the area may be displayed in the area.

A method for identifying a character input on the virtual keyboard 4, a method for determining which candidate displayed in the input character string candidate display area 14 is selected, and a method for identifying a mark input with the mark areas 15A and 15B will be explained bellow. In the description below, when the mark area 15A and the mark area 15B are not particularly discriminated from each other, they will be referred to as a mark area 15 generically.

The method for identifying a character input on the virtual keyboard 4 will be described. As illustrated in FIG. 2, the virtual keyboard 4 includes a plurality of virtual buttons resembling keys of a physical keyboard. If the user makes a gesture of putting the finger on (bringing the finger into contact with) a button "Q" in the virtual keyboard 4, and pulling the finger away therefrom, for example, the touch panel 2 detects the gesture, whereby the mobile phone terminal 1 receives a character "Q" as input.

The mobile phone terminal 1 further receives input of characters by a consecutive method on the virtual keyboard 4. The consecutive method used herein means a method for allowing the user to input a plurality of characters consecutively by moving the finger on the virtual keyboard 4 with the finger keeping the touch with the touch panel 2. In the consecutive method, for example, the user moves the finger in a sliding manner in order of a button "W", a button "E", and a button "T" with the finger keeping the touch with the touch panel 2, thereby inputting a character string "WET".

As described above, in the consecutive method, only by moving the finger on the touch panel 2 in the sliding manner, the user can input a plurality of characters without making a gesture of moving the finger up and down for each button. Accordingly, the user can input the characters at extremely high speed.

In the consecutive method, however, for each button arranged on the trajectory along which the user moves the finger, it is required to determine whether the user intentionally touches the button to input a character corresponding thereto, or whether the user moves the finger across the button only to move the finger to another button. For example, an assumption is made that the virtual keyboard 4 has the QWERTY arrangement, and that the user desires to input the word "WET" described above. In this case, when moving from the button "E" to the button "T", the finger of the user passes across a button "R" arranged therebetween. As a result, if it fails to be determined that the user touches the button "R" not intentionally, a character string "WERT" is received as input despite the intention of the user.

Therefore, the mobile phone terminal 1 determines a button displayed at a position where the touch panel 2 detects a specific gesture to be a button intentionally touched by the user to input a character among buttons arranged on the trajectory along which the user moves the finger. Specifically, in the case where the touch panel 2 detects a gesture of starting touch of the finger, if a button is present at the position where the start of the touch is detected, the mobile phone terminal 1 determines the button to be intentionally touched. Furthermore, in the case where the touch panel 2 detects a gesture of finishing the movement of the finger and pulling the finger away from the touch panel 2, if a button is present at the position where the termination of the touch is detected, the mobile phone terminal 1 determines the button to be intentionally touched.

Furthermore, in the case where the touch panel 2 detects a gesture of changing the direction of movement of the finger with the finger keeping the touch with the touch panel 2, if a button is present at the position where the change of the direction of movement is detected, the mobile phone terminal 1 determines the button to be intentionally touched. Specifically, the mobile phone terminal 1 compares the direction of movement when the finger enters the button and the direction of movement when the finger leaves the button. If the angular difference between the directions of the movements is larger than a threshold value, the mobile phone terminal 1 determines the button to be intentionally touched by the user.

Figure 3:
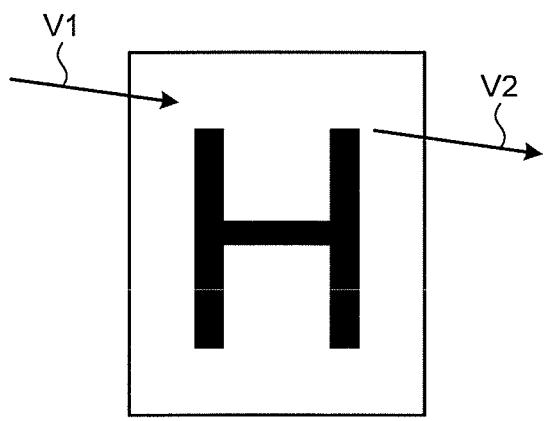
FIG. 3 is a diagram illustrating an example in which a finger passes across a button area.
Figure 4:
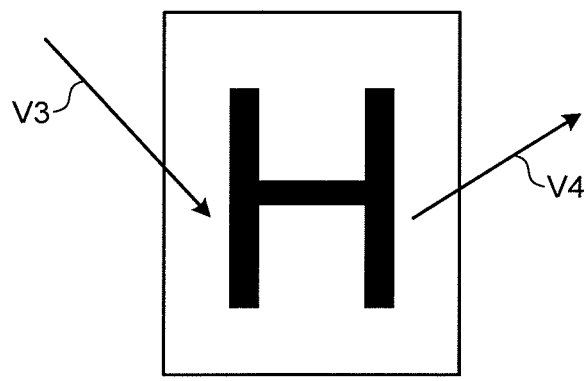
FIG. 4 is a diagram illustrating an example in which a direction of movement of the finger is changed in the button area.

This is because, while the finger is moving to another button, and only passing across a button, the finger moves on the button in one direction, and the angular difference between V1 indicating the direction of movement (vector) when entering the button and V2 indicating the direction of movement when leaving the button is assumed to be small as illustrated in FIG. 3. Furthermore, this is because, if the angular difference between V3 indicating the direction of movement when entering the button and V4 indicating the direction of movement when leaving the button is large as illustrated in FIG. 4, it is highly possible that the user intentionally touches the button, and changes the direction of movement to touch another button. In other words, it can be determined that the button is one of target buttons.

Figure 5:
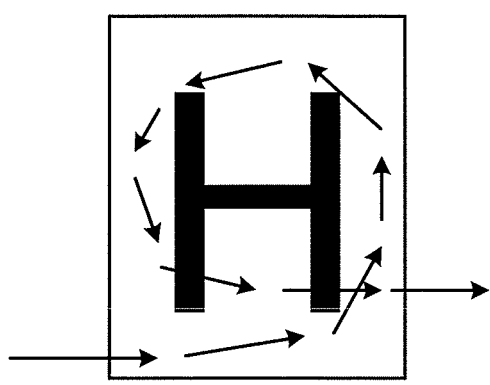
FIG. 5 is a diagram illustrating an example in which the finger draws a rotational trajectory in the button area.

Furthermore, if the touch panel 2 detects a gesture of moving the finger drawing a rotational trajectory in a button area with the finger keeping the touch with the touch panel 2 as illustrated in FIG. 5, the mobile phone terminal 1 determines that the user intentionally touches the button. This is because, if the finger only passes across the button, the finger is not assumed to move drawing such a trajectory. The trajectory is not limited to the rotational trajectory. Alternatively, the mobile phone terminal 1 may determine that the user intentionally touches the button if the finger draws a trajectory of a characteristic shape, such as a mountain shape and a wave shape, in the button area.

As described above, if movement of the finger drawing a trajectory of a characteristic shape in a button area is detected, it is determined that the button is intentionally touched. This allows the user to input the same character consecutively in a simple manner. If the user desires to input a character "W" three times consecutively, for example, the user needs only to move the finger such that the finger draws a circle three times in a button area of "W". At this time, for example, every time the total angle of the movement vector of the finger in the button area exceeds 360 degrees, one rotation is counted. Thus, the number of rotations can be counted.

An example of an operation is illustrated in FIG. 6 in which the user inputs "electronics (EREKUTORONIKUSU)" to the mobile phone terminal 1. At s1, after the finger is positioned in a button area of "E", the finger passes across buttons in order of "R", "E", "H", "J", and "K" while keeping the touch with the touch panel 2. In this case, the mobile phone terminal 1 determines the button "E" on which the finger is positioned, and the buttons "R", "E", and "K" in which the angular difference between the direction of entering and the direction of leaving is larger than the threshold value to be intentionally touched.

At s2, the finger passes across buttons in order of "U", "Y", "T", "Y", "U", and "I" while keeping the touch with the touch panel 2. In this case, the mobile phone terminal 1 determines the buttons "U" and "T" in which the angular difference between the direction of entering and the direction of leaving is larger than the threshold value to be intentionally touched.

At s3, the finger passes across buttons in order of "O", "I", "U", "Y", "T", "R", "T", "Y", "U", and "I" while keeping the touch with the touch panel 2. In this case, the mobile phone terminal 1 determines the buttons "O" and "R" in which the angular difference between the direction of entering and the direction of leaving is larger than the threshold value to be intentionally touched.

At s4, the finger passes across buttons in order of "O", "K", "N", and "J" while keeping the touch with the touch panel 2. In this case, the mobile phone terminal 1 determines the buttons "O" and "N" in which the angular difference between the direction of entering and the direction of leaving is larger than the threshold value to be intentionally touched. At s5, the finger passes across buttons in order of "I", "K", "U", "G", "F", "D", "S", "R", "T", and "Y" while keeping the touch with the touch panel 2. In this case, the mobile phone terminal 1 determines the buttons "I", "K", "U", and "S" in which the angular difference between the direction of entering and the direction of leaving is larger than the threshold value to be intentionally touched.

At s6, the finger that has moved to the button "U" while keeping the touch with the touch panel 2 moves away from the touch panel 2 in the button area of "U". In this case, the mobile phone terminal 1 determines the button "U" arranged at the position where the finger moves away from the touch panel 2 to be intentionally touched.

With the operations described above, the mobile phone terminal 1 determines that the buttons are intentionally touched in order of "E", "R", "E", "K", "U", "T", "O", "R", "O", "N", "I", "K", "U", "S", and "U". The mobile phone terminal 1 then receives "electronics (EREKUTORONIKUSU)" obtained by combining the characters corresponding to these buttons in chronological order as an input character string. The character string is identical to the character string intended to be input by the user.

As illustrated in the example of FIG. 6, for each button arranged on the trajectory along which the finger of the user moves while keeping the touch with the touch panel 2, the mobile phone terminal 1 accurately determines whether the finger intentionally touches it, or only passes across it based on the gesture naturally made by the user, thereby receiving input of the characters. Accordingly, the user can input the characters accurately to the mobile phone terminal 1 at high speed.

The mobile phone terminal 1 does not disregard the characters corresponding to the buttons determined to be buttons across which the finger only passes, but uses the characters to improve the input accuracy. Specifically, the mobile phone terminal 1 refers to a dictionary for the character string obtained by combining the characters corresponding to the buttons determined to be intentionally touched by the user in chronological order. If a word corresponding thereto fails to be found, the mobile phone terminal 1 supplies the character string with the characters corresponding to the buttons determined to be buttons across which the finger only passes, and refers to the dictionary again for the character string thus supplied with the characters to find a proper word.

If the user desires to input the word "WET" to the mobile phone terminal 1, the user puts the finger in the button area of "W", moves the finger in the direction toward the button "T" with the finger keeping the touch with the touch panel 2, and pulls the finger away from the touch panel 2 in the button area of "T". In this case, the button "W" on which the finger is positioned and the button "T" from which the finger is pulled away are determined to be intentionally touched. By contrast, the buttons "E" and "R" arranged on the trajectory along which the finger moves are determined to be buttons across which the finger only passes because the angular difference between the direction of entering and the direction of leaving is small.

However, "WT" that is a character string obtained by combining the characters corresponding to the buttons determined to be intentionally touched by the user in chronological order is not present in the dictionary. Therefore, the mobile phone terminal 1 supplies the character string with the characters corresponding to the buttons determined to be buttons across which the finger only passes in chronological order, creates candidates of "WET", "WRT", and "WERT", and refers to the dictionary for each candidate. In this case, because the word "WET" is included in the dictionary, the mobile phone terminal 1 receives "WET" as the input characters. The character string is identical to the character string intended to be input by the user.

If the word "WET" is to be input, the user may draw a rotational trajectory on the button "E" while moving the finger from the button "W" toward the button "T" with the finger keeping the touch with the touch panel 2. Performing such an operation allows the user to indicate explicitly to the mobile phone terminal 1 that the user intentionally touches the button "E", thereby making it possible to improve the identification accuracy of the input character string.

The method for determining which candidate displayed in the input character string candidate display area 14 is selected will now be described. If the touch panel 2 detects a gesture of putting the finger in (bringing the finger into contact with) a display area of a candidate and pulling the finger away therefrom, the mobile phone terminal 1 determines that the candidate displayed in the display area is selected.

Furthermore, if the touch panel 2 detects that the user makes a specific gesture in a display area of a candidate with the finger keeping the touch with the touch panel 2, the mobile phone terminal 1 determines that the candidate displayed in the display area is selected. The specific gesture herein means a gesture obviously indicating that the user moves the finger across a display area of a candidate not for moving the finger to another position. Examples of the specific gesture include a gesture of the finger changing the direction of movement in a display area of a candidate while keeping the touch with the touch panel 2, and a gesture of the finger moving to draw a rotational trajectory in a display area of a candidate while keeping the touch with the touch panel 2.

As described above, prediction and conversion are performed to display a candidate of the input character string based on the gesture made by the user with the finger keeping the touch with the touch panel 2, and it is determined which candidate is selected based on the gesture made by the user with the finger keeping the touch with the touch panel 2. As a result, it is possible to select a candidate without making a gesture of moving the finger up and down. This allows the user to input characters consecutively at high speed by the consecutive method described above.

Figure 7A:
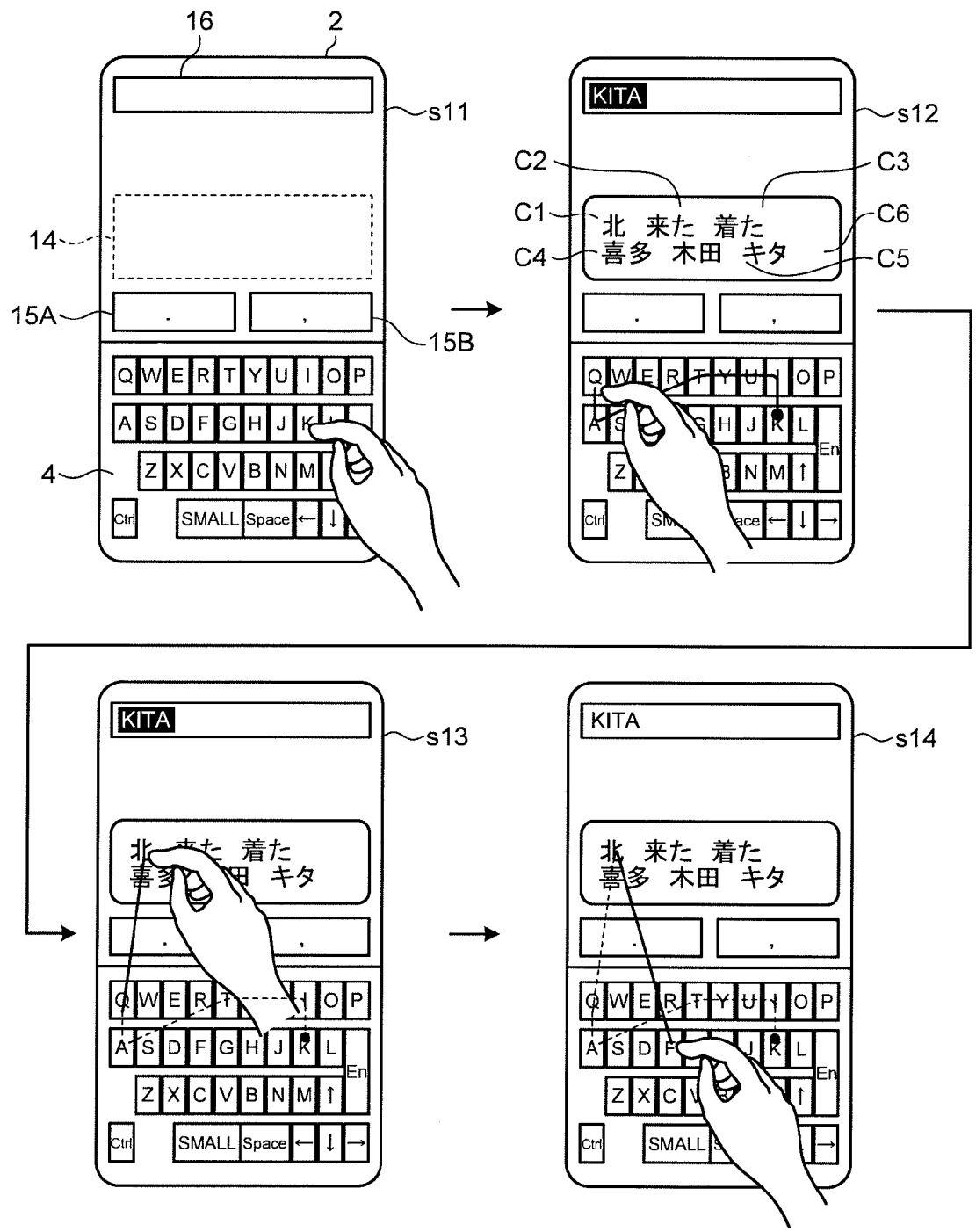
FIG. 7A is a diagram illustrating an exemplary operation of selection of a candidate.

FIG. 7A illustrates an example of selection of a candidate in the case where the user intends to input a Japanese Kanji String corresponding to a character string "KITAFUCHUU". At s11, the finger is positioned at a button area of "K". At s12, after passing across buttons in order of "I", "U", "Y", "T", "R", "S", and "A" while keeping the touch with the touch panel 2, the finger moves upward so as to select a candidate displayed in the input character string candidate display area 14, and enters a button area of "Q". In this case, the mobile phone terminal 1 determines the button "K" on which the finger is positioned, and the buttons "I", "T", and "A" in which the angular difference between the direction of entering and the direction of leaving is larger than the threshold value to be intentionally touched.

Subsequently, the mobile phone terminal 1 predicts a character string intended to be input by the user from "KITA" obtained by combining the characters corresponding to the buttons determined to be intentionally touched. The mobile phone terminal 1 then displays candidates C1 to C6 obtained by kanji conversion processing in the input character string candidate display area 14. At s12, the mobile phone terminal 1 highlights "KITA" obtained by converting "KITA" into hiragana in a text input area 16 to which the characters are to be input as a temporary input result. The text input area 16 is an area arranged temporarily on the touch panel 2 by an arbitrary computer program such as a browser program.

At s13, the finger passes across the button "Q", and the mark area 15A, enters the input character string candidate display area 14, passes across a display area of the candidate C4, and moves into a display area of the candidate C1 while keeping the touch with the touch panel 2. In this case, the button "Q" is determined to be a button across which the finger only passes because the angular difference between the direction of entering and the direction of leaving is smaller than the threshold value. As a result, the display in the input character string candidate display area 14 does not change. Furthermore, the mark area 15A is determined to be an area across which the finger only passes because the angular difference between the direction of entering and the direction of leaving is smaller than the threshold value. At s14, in order to input "FUCHUU", the finger changes the direction of movement in the display area of the candidate C1, passes across the display area of the candidate C4 and the mark area 15A, and moves into a button area of "F" while keeping the touch with the touch panel 2.

Figure 8:
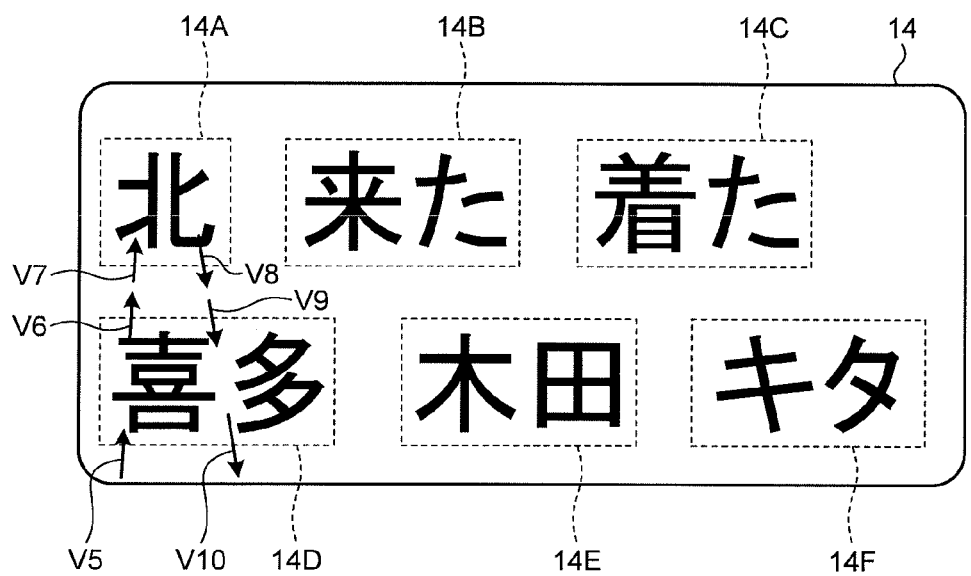
FIG. 8 is a diagram illustrating an exemplary change in a direction of movement of the finger in an input character string candidate display area.

At s13 and s14 in the example illustrated in FIG. 7A, the candidates C1 to C6 are displayed in candidate areas 14A to 14F, respectively, of the input character string candidate display area 14 as illustrated in FIG. 8. In the candidate area 14A in which the candidate C1 is displayed, the angular difference between V7 indicating the direction of movement of the finger when entering and V8 indicating the direction of movement of the finger when leaving is larger than the threshold value. As a result, a gesture of changing the direction of movement of the finger is detected in the candidate area 14A, whereby the mobile phone terminal 1 determines that the candidate C1 is selected. The mobile phone terminal 1 then displays the candidate C1 in the text input area 16 in a normal manner as a final input result.

By contrast, the finger passes twice across the candidate area 14D in which the candidate C4 is displayed. The angular difference in the first passing between V5 indicating the direction of movement when entering and V6 indicating the direction of movement when leaving is smaller than the threshold value. The angular difference in the second passing between V9 indicating the direction of movement when entering and V10 indicating the direction of movement when leaving is also smaller than the threshold value. As a result, the mobile phone terminal 1 does not determine that the candidate C4 is selected.

As illustrated in the example of FIG. 7A, for each candidate area arranged on the trajectory along which the finger of the user moves while keeping the touch with the touch panel 2, the mobile phone terminal 1 accurately determines whether the finger intentionally touches it, or only passes across it based on the gesture naturally made by the user.

The method for identifying a mark input with the mark areas 15A and 15B will now be described. The mark areas 15A and 15B correspond to marks such as a period and a comma, respectively, in advance. If the touch panel 2 detects a gesture of putting the finger in (bringing the finger into contact with) either of the mark areas 15 and pulling the finger away therefrom, the mobile phone terminal 1 receives the mark corresponding to the mark area 15 as an input character.

Furthermore, if the touch panel 2 detects that the user makes a specific gesture in either of the mark areas 15 with the finger keeping the touch with the touch panel 2, the mobile phone terminal 1 receives the mark corresponding to the mark area 15 as an input character. The specific gesture herein means a gesture obviously indicating that the user moves the finger across the mark area 15 not for moving the finger to another position. Examples of the specific gesture include a gesture of the finger changing the direction of movement in the mark area 15 while keeping the touch with the touch panel 2, and a gesture of the finger moving to draw a rotational trajectory in the mark area 15 while keeping the touch with the touch panel 2.

Figure 7B:
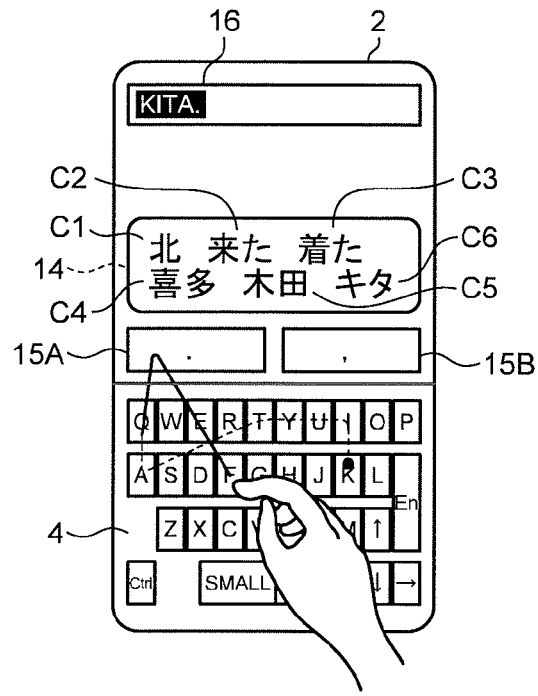
FIG. 7B is a diagram illustrating an exemplary operation of mark input.
Figure 7C:
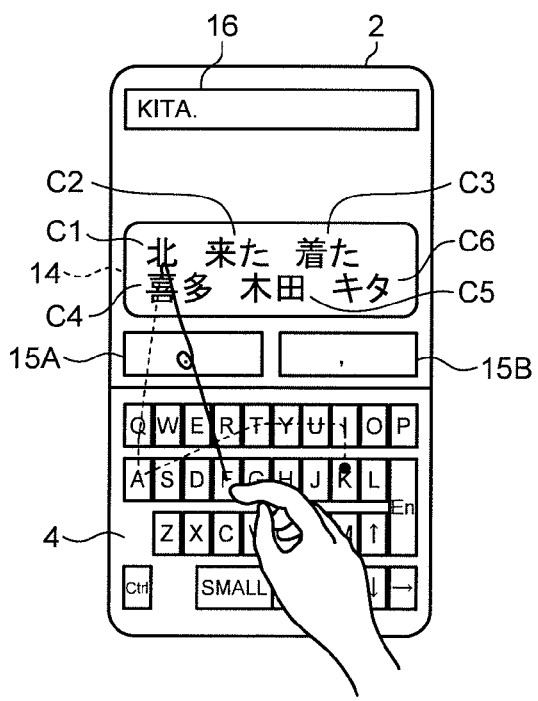
FIG. 7C is a diagram illustrating another exemplary operation of the mark input.

At s13 and s14 in the example illustrated in FIG. 7A, for example, the angular difference between the direction in which the finger enters the mark area 15A and the direction in which the finger leaves the area is small, and it is assumed that the user moves the finger across the mark area 15A to move the finger to another position. As a result, it is not determined that the mark corresponding to the mark area 15A is input. By contrast, in the example illustrated in FIG. 7B, the angular difference between the direction in which the finger enters the mark area 15A and the direction in which the finger leaves the area is large, and it is obvious that the user moves the finger across the mark area 15 not for moving the finger to another position. As a result, it is determined that a period that is the mark corresponding to the mark area 15A is input. Furthermore, in the example illustrated in FIG. 7C, the finger moves to draw a rotational trajectory in the mark area 15 while keeping the touch with the touch panel 2, and it is obvious that the user moves the finger across the mark area 15 not for moving the finger to another position. As a result, it is determined that a period that is the mark corresponding to the mark area 15A is input.

Receiving input of a mark based on the gesture made by the user with the finger keeping the touch with the touch panel 2 in this manner allows the user to input the mark without making a gesture of moving the finger up and down. This makes it possible to perform input of characters consecutively at high speed by the consecutive method described above.

The number of mark areas 15 is not restricted to two, and may be any number. Furthermore, the position of the mark area 15 may be a position other than the position between the virtual keyboard 4 and the input character string candidate display area 14. For example, the position of the mark area 15 may be below the virtual keyboard 4.

Figure 7D:
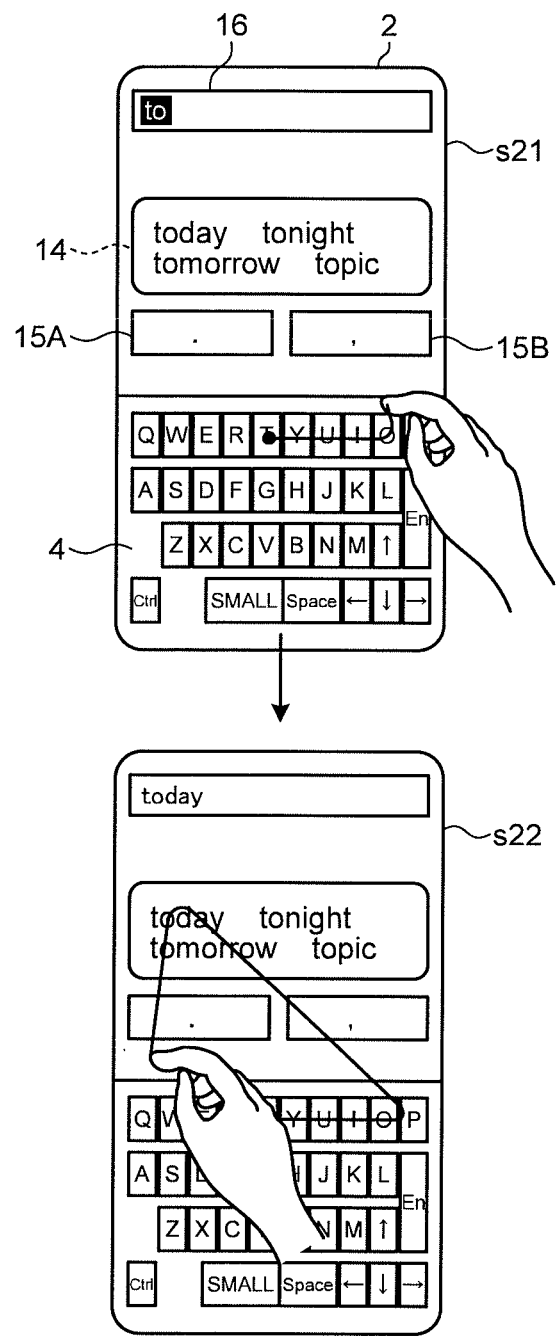
FIG. 7D is a diagram illustrating another exemplary operation of selection of a candidate.

The input of characters by the consecutive method enables high-speed input even if characters of a language other than Japanese are to be input. An example in which an English sentence is input by the consecutive method will be described with reference to FIG. 7D. FIG. 7D illustrates an example in which the user inputs a character string "today" by the consecutive method.

At s21, the finger positioned in a button area of "T" passes across buttons in order of "Y", "U", "I", and "O" while keeping the touch with the touch panel 2, and moves upward. In this case, the mobile phone terminal 1 determines the button "T" on which the finger is positioned, and the button "O" in which the angular difference between the direction of entering and the direction of leaving is larger than the threshold value to be intentionally touched.

Subsequently, the mobile phone terminal 1 performs prediction and conversion processing for a character string intended to be input by the user from "TO" obtained by combining characters corresponding to the buttons determined to be intentionally touched. The mobile phone terminal 1 then displays four candidates of "today", "tonight", "tomorrow", and "topic" obtained by the prediction and conversion processing in the input character string candidate display area 14. Furthermore, at s21, the mobile phone terminal 1 highlights "to" in the text input area 16 to which the characters are to be input as a temporary input result.

At s21, the finger passes across the mark area 15B and a display area of "tomorrow", changes the direction of movement in a display area of "today", and passes across the display area of "tomorrow" and the mark area 15A while keeping the touch with the touch panel 2. In this case, the angular difference between the direction in which the finger enters the display area of "today" and the direction in which the finger leaves the area is large, and the angular differences between the directions in which the finger enters other areas and the directions in which the finger leaves the areas are small. As a result, a gesture of changing the direction of movement of the finger is detected in the display area of "today", whereby the mobile phone terminal 1 determines that "today" is selected. The mobile phone terminal 1 then displays "today" in the text input area 16 in the normal manner as a final input result.

Figure 9:
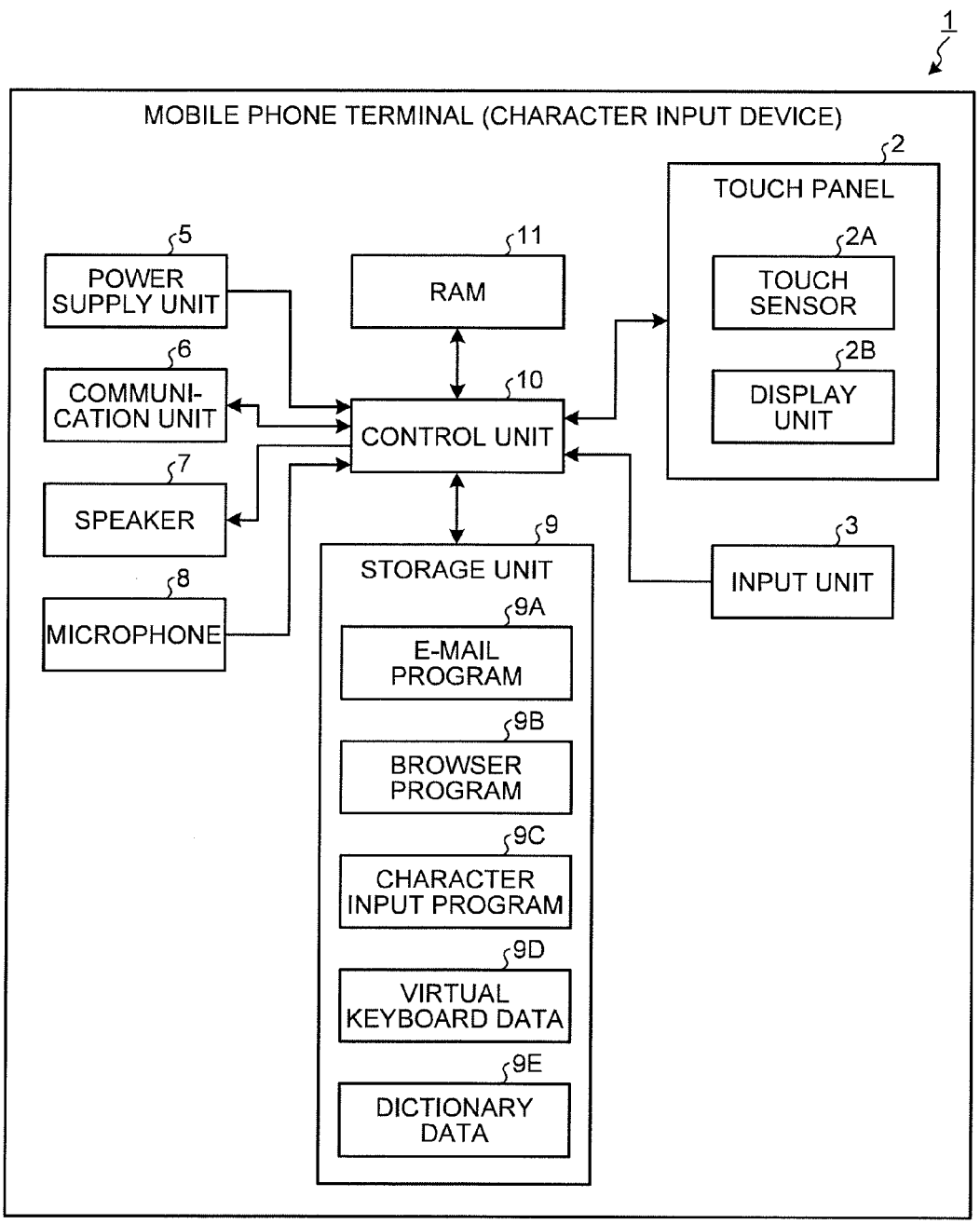
FIG. 9 is a block diagram illustrating a schematic configuration of functions of the mobile phone terminal.

The relationship between a control unit and functions of the mobile phone terminal 1 will now be described. FIG. 9 is a block diagram illustrating a schematic configuration of the functions of the mobile phone terminal 1 illustrated in FIG. 1. As illustrated in FIG. 9, the mobile phone terminal 1 includes the touch panel 2, the input unit 3, a power supply unit 5, a communication unit 6, a speaker 7, a microphone 8, a storage unit 9, a control unit 10, and a random access memory (RAM) 11.

The touch panel 2 includes a display unit 2B and a touch sensor 2A superimposed on the display unit 2B. The touch sensor 2A detects various types of gestures made with respect to the touch panel 2 using the finger as well as a position in which the gesture is made on the touch panel 2. The gestures detected by the touch sensor 2A include a gesture of bringing the finger into contact with the surface of the touch panel 2, a gesture of moving the finger with the finger keeping the touch with the surface of the touch panel 2, and a gesture of pulling the finger away from the surface of the touch panel 2. The touch panel 2 may adopt any sensing method, such as a pressure-sensitive method, and a capacitance method. The display unit 2B is formed of a liquid crystal display (LCD), an organic electro-luminescence (EL) panel, for example, and displays a character, a figure, an image, and the like.

The input unit 3 receives an operation performed by the user via a physical button or the like, and transmits a signal corresponding to the operation thus received to the control unit 10. The power supply unit 5 supplies electricity obtained from a battery or an external power supply to each function unit of the mobile phone terminal 1 including the control unit 10. The communication unit 6 establishes a wireless signal path by a code division multiple access (CDMA) method or the like with a base station via a channel allocated by the base station, and performs telephone communications and information communications with the base station. The speaker 7 outputs a voice on the other side in the telephone communications, a ring tone, and the like. The microphone 8 converts a voice of the user or the like into an electrical signal.

The storage unit 9 is a nonvolatile memory or a magnetic-storage device, for example, and stores therein a computer program and data used for processing in the control unit 10. Specifically, the storage unit 9 stores therein an e-mail program 9A for transmitting and receiving, and reading an e-mail, a browser program 9B for browsing a Web page, a character input program 9C for receiving input of a character by the consecutive method described above, virtual keyboard data 9D including the definition related to the virtual keyboard displayed on the touch panel 2 when a character is input, and dictionary data 9E in which information used for predicting and converting an input character string is registered. The storage unit 9 also stores therein an operating system program that realizes basic functions of the mobile phone terminal 1, and other computer programs and data, such as address book data in which names, phone numbers, e-mail addresses, and the like are registered.

The control unit 10 is a central processing unit (CPU), for example, and controls operations of the mobile phone terminal 1 integrally. Specifically, the control unit 10 executes the computer program stored in the storage unit 9 while referring to the data stored in the storage unit 9 as necessary, and controls the touch panel 2, the communication unit 6, and the like to perform various types of processing. The control unit 10 loads the computer program stored in the storage unit 9 and data that is acquired, generated, and processed by performing the processing on the RAM 11 providing a temporary storage area as necessary. The computer program executed by the control unit 10 and the data referred to by the control unit 10 may be downloaded from a server device through wireless communications performed by the communication unit 6.

FIG. 10 illustrates an example of the virtual keyboard data 9D stored in the storage unit 9. As illustrated in the example of FIG. 10, in the virtual keyboard data 9D, a character corresponding to a button, the position (e.g., the top-left coordinate), the width, the height, and the like of the button are registered for each button included in the virtual keyboard. In the example illustrated in FIG. 10, it is registered that a character corresponding to a button is "Q", that the top-left coordinate of the button represents x=10 and Y=10, and that the width and the height of the button are 20 and 40, respectively.

Figure 11:
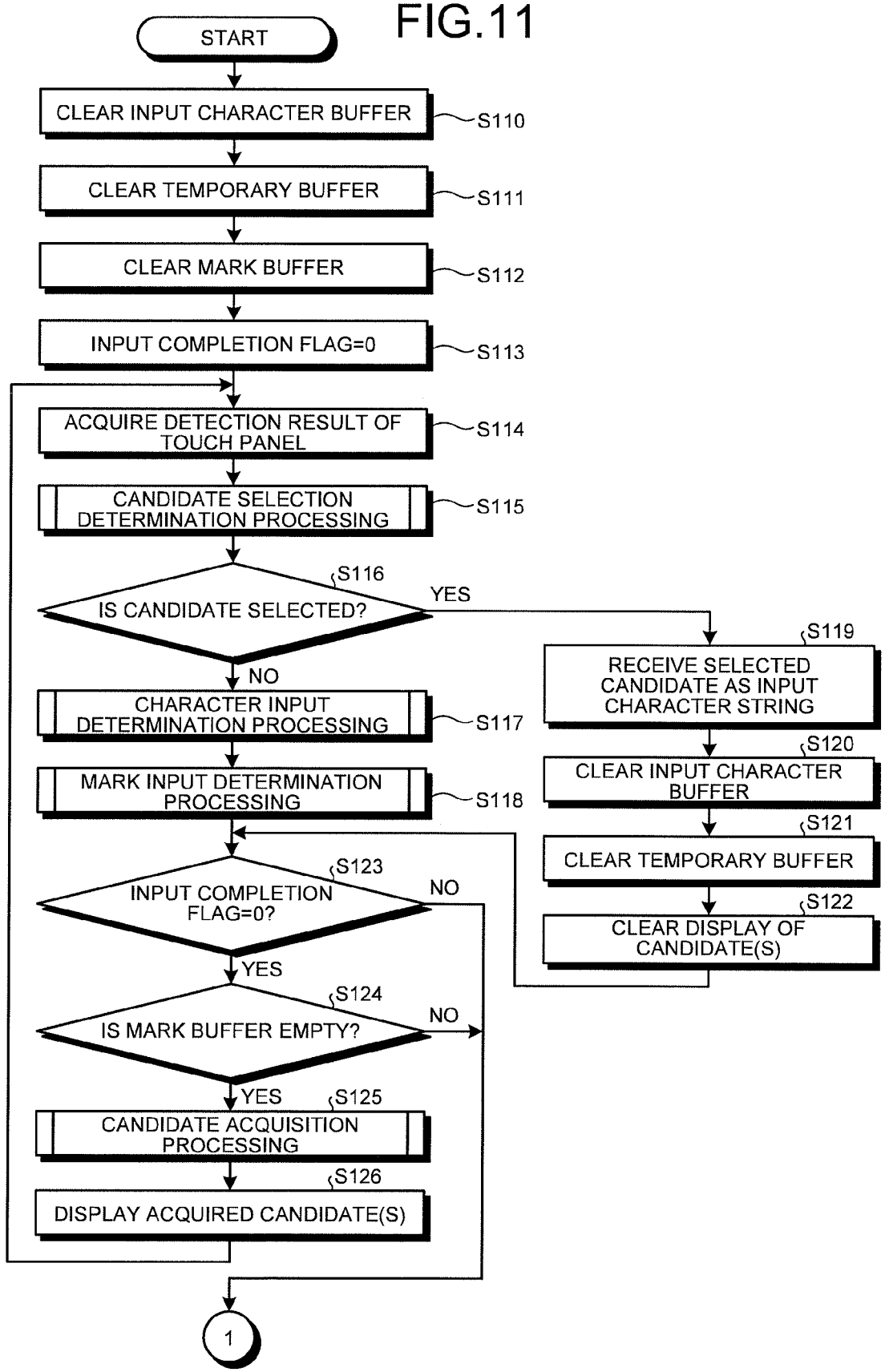
FIG. 11 is a flowchart illustrating a processing process of character input processing performed by the mobile phone terminal.
Figure 12:
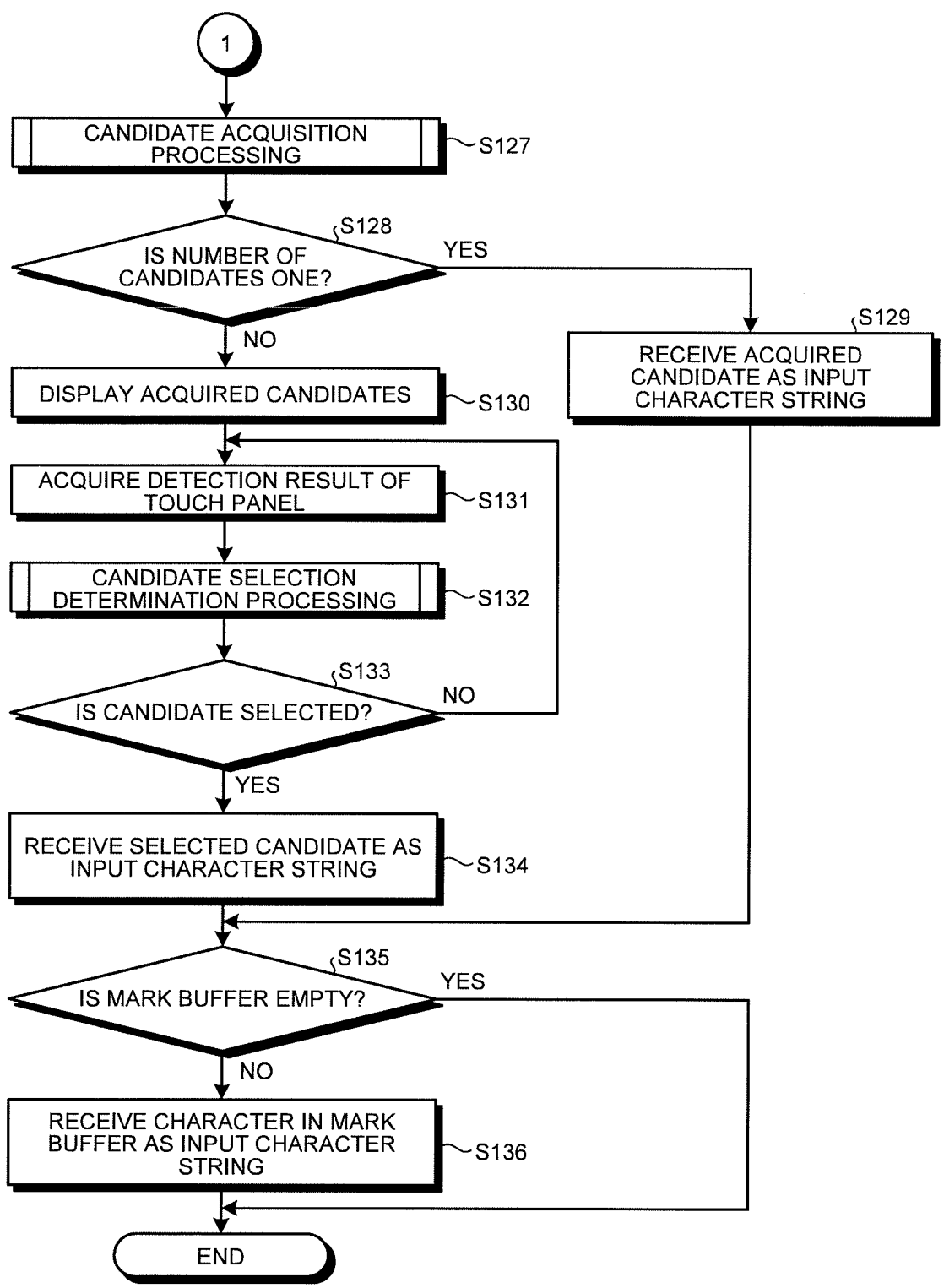
FIG. 12 is a flowchart illustrating a processing process of the character input processing performed by the mobile phone terminal.

An operation performed when the mobile phone terminal 1 receives input of a character will now be described. FIG. 11 and FIG. 12 are flowcharts of a processing process of character input processing performed by the mobile phone terminal 1. The control unit 10 reads and executes the character input program 9C from the storage unit 9, thereby realizing the character input processing illustrated in FIG. 11 and FIG. 12. The character input processing is performed repeatedly while the virtual keyboard 4 is being displayed on the touch panel 2. The virtual keyboard 4 is displayed on the touch panel 2 by the control unit 10 executing the character input program 9C or another computer program.

The control unit clears an input character buffer 12 at Step S110, clears a temporary buffer 13 at Step S111, and clears a mark buffer at Step S112. The input character buffer 12 is a storage area that stores therein a character corresponding to each button on the trajectory along which the finger moves while keeping the touch with the touch panel 2 in a manner corresponding to priority, and is included in the RAM 11. The temporary buffer 13 is a storage area that temporarily stores therein a character corresponding to a button determined to be a button across which the finger only passes among buttons on the trajectory along which the finger moves while keeping the touch with the touch panel 2, and is included in the RAM 11. The mark buffer is a storage area that stores therein a mark received by a specific gesture made with respect to the mark area 15, and is included in the RAM 11.

Figure 13:
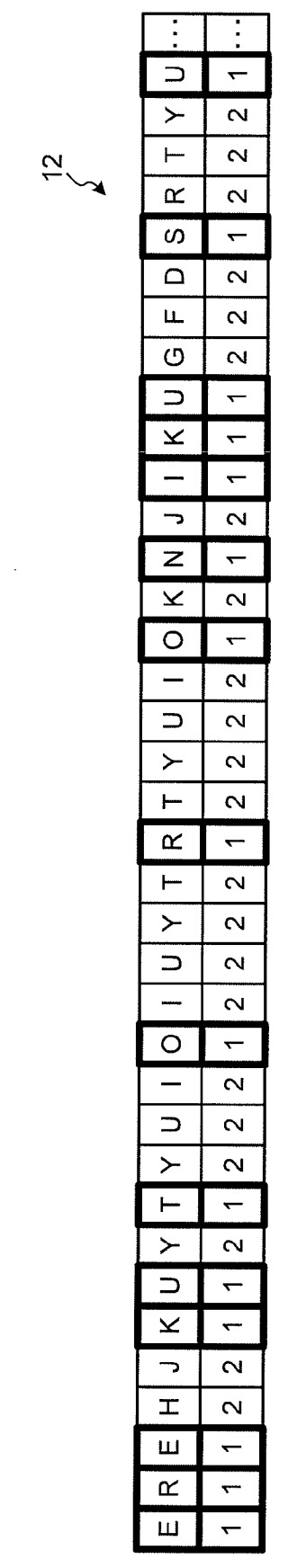

An example of the input character buffer 12 is illustrated in FIG. 13. FIG. 13 illustrates the input character buffer 12 when the operation illustrated in FIG. 6 is performed on the touch panel 2. In the example illustrated in FIG. 13, the characters corresponding to the buttons on the trajectory along which the finger moves while keeping the touch with the touch panel 2 are stored in the upper row of the input character buffer 12, and the priority corresponding to each of the characters in the upper row is stored in the lower row. As illustrated in the example of FIG. 13, the input character buffer 12 stores therein the characters corresponding to the buttons on the trajectory along which the finger moves while keeping the touch with the touch panel 2 in chronological order.

The priority is used for determining whether the character corresponding thereto is employed when a character string is created by combining the characters included in the input character buffer 12. In the present embodiment, as the value of the priority is small, the character corresponding thereto is employed preferentially. Specifically, "1" is assigned as priority to a character corresponding to a button determined to be intentionally touched by the finger, and "2" is assigned as priority to a character corresponding to a button determined to be a button across which the finger only passes.

Figure 14:
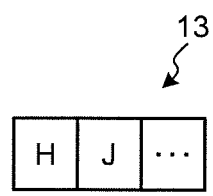
FIG. 14 is a diagram illustrating an example of a temporary buffer.

An example of the temporary buffer 13 is illustrated in FIG. 14. FIG. 14 illustrates the temporary buffer 13 at the point when the finger leaves the button "J" at s1 in FIG. 6. As illustrated in the example of FIG. 14, the temporary buffer 13 stores therein the characters corresponding to the buttons determined to be buttons across which the finger only passes in chronological order until any button is determined to be intentionally touched by the finger.

After clearing the input character buffer 12 and the temporary buffer 13, the control unit 10 sets an input completion flag included in the RAM 11 to 0 at Step S113. The input completion flag is used for determining whether input of characters at a time is completed. The input of characters at a time herein means input of characters performed from when the user causes the finger to touch with the touch panel 2 to when the user pulls the finger away therefrom.

Subsequently, the control unit 10 acquires the latest detection result of the touch panel 2 at Step S114, and performs candidate selection determination processing at Step S115. In the candidate selection determination processing, the control unit 10 determines whether any one of the candidates displayed in the input character string candidate display area 14 is selected. The detail of the candidate selection determination processing will be described later.

If none of the candidates displayed in the input character string candidate display area 14 is selected (NO at Step S116), the control unit 10 performs character input determination processing at Step S117, and performs mark input determination processing at Step S118. Subsequently, the control unit 10 performs processing of Step S123.

In the character input determination processing, the control unit 10 stores a character corresponding to each button displayed on the trajectory along which the finger moves while keeping the touch with the touch panel 2 in the input character buffer 12 and the temporary buffer 13. Furthermore, in the mark input determination processing, the control unit 10 stores a mark received by a specific gesture made with respect to the mark area 15 in the mark buffer. The details of the character input determination processing and the mark input determination processing will be described later.

By contrast, if any one of the candidates displayed in the input character string candidate display area 14 is selected (YES at Step S116), the control unit 10 receives the candidate thus selected as an input character string at Step S119. Then, the control unit 10 clears the input character buffer 12 at Step S120 and clears the temporary buffer 13 at Step S121 in order to restart receiving input of characters. Subsequently, the control unit 10 clears the display of the candidate(s) in the input character string candidate display area 14 at Step S122, and performs the processing of Step S123.

The control unit 10 determines whether the input completion flag remains to be 0 at Step S123, and determines whether the mark buffer is empty at Step S124. At this time, if the input completion flag remains to be 0, and if the mark buffer is empty, that is, if the input of characters at a time is not completed yet, and if no mark is input (YES at Step S123 and YES at Step S124), the control unit 10 performs candidate acquisition processing at Step S125, and acquires character string(s) predicted or converted from a character string obtained by combining the characters stored in the input character buffer 12 from the dictionary data 9E. The detail of the candidate acquisition processing will be described later.

Subsequently, the control unit 10 displays one or more character strings acquired by the candidate acquisition processing in the input character string candidate display area 14 at Step S126. The control unit 10 then performs the processing of Step S114 to Step S126 repeatedly until it is determined that the input completion flag is not 0, that is, it is determined that the input of characters at a time is completed at Step S123, or until it is determined that the mark buffer is not empty, that is, it is determined that a mark is input at Step S124.

If the input completion flag is not 0 at Step S123 (NO at Step S123), or if the mark buffer is not empty at Step S124 (NO at Step S124), the control unit 10 performs the candidate acquisition processing at Step S127, and acquires character string(s) predicted or converted from a character string obtained by combining the characters stored in the input character buffer 12 from the dictionary data 9E. At this time, if a number of the character strings acquired as the processing result of the candidate acquisition processing is one (YES at Step S128), the control unit 10 receives the character string acquired as the processing result of the candidate acquisition processing as an input character string at Step S129.

By contrast, if a number of the character strings acquired as the processing result of the candidate acquisition processing is tow or more (NO at Step S128), the control unit 10 displays the plurality of character strings acquired as the processing result of the candidate acquisition processing in the input character string candidate display area 14 at Step S130. Subsequently, the control unit 10 acquires the latest detection result of the touch panel 2 at Step S131, and performs the candidate selection determination processing at Step S132 to determine whether any one of the character strings displayed in the input character string candidate display area 14 is selected.

At this time, if none of the character strings is selected (NO at Step S133), the control unit 10 performs the processing of Step S131 to Step S133 repeatedly until any one of the character strings is selected. At Step S133, if a gesture indicating cancel of the input, such as a gesture of the finger of the user keeping the touch with an area other than the input character string candidate display area 14, is detected, the control unit 10 may terminate the character input processing.

If any one of the character strings displayed in the input character string candidate display area 14 is selected at Step S133, (YES at Step S133), the control unit 10 receives the character string thus selected as an input character string at Step S134. The control unit 10 then determines whether the mark buffer is empty at Step S135. If the mark buffer is not empty (NO at Step S135), the control unit 10 receives the character in the mark buffer as an input character at Step S136.

Figure 15A:
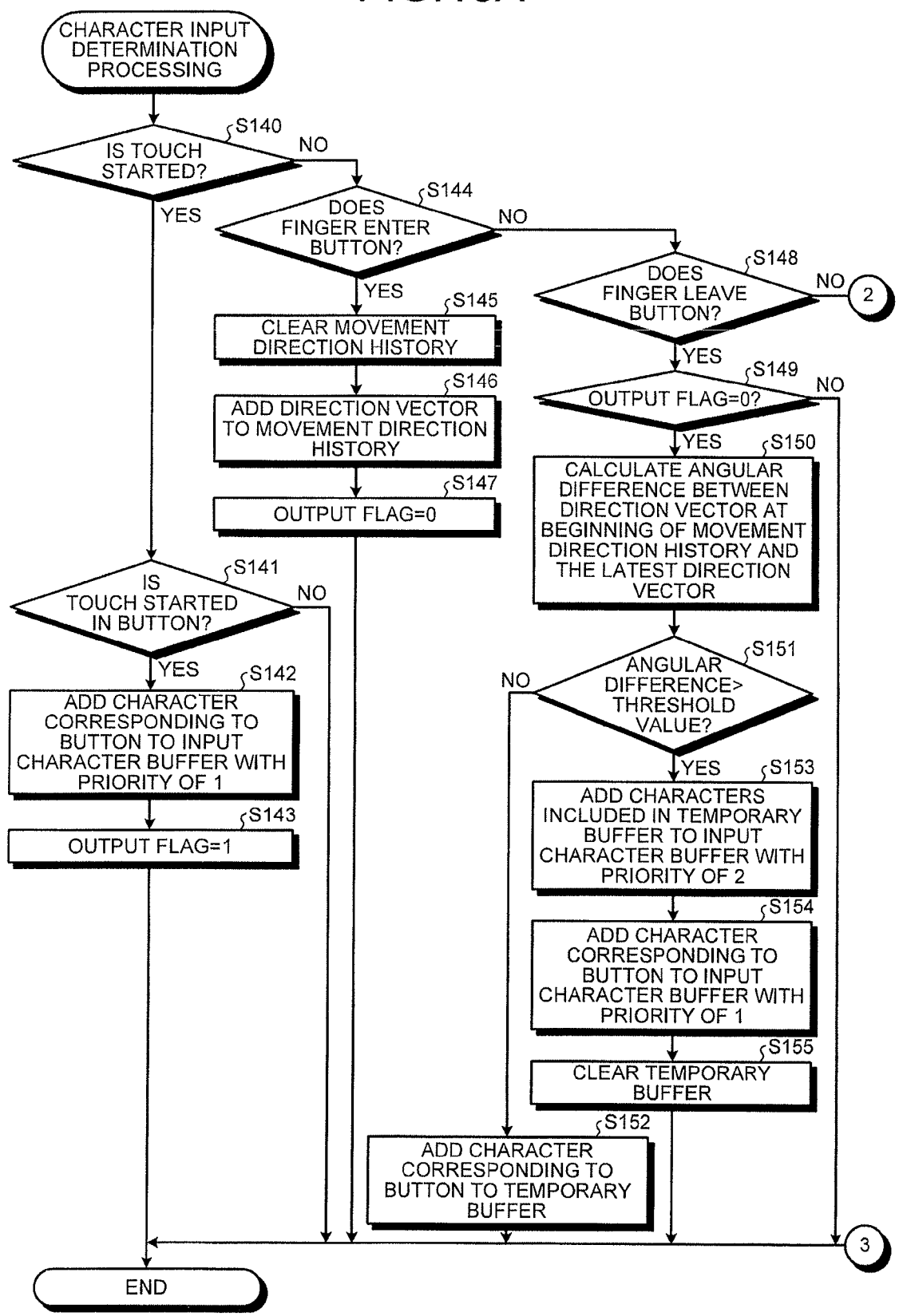
FIGS. 15A and 15B are flowcharts illustrating a processing process of character input determination processing.
Figure 15B:
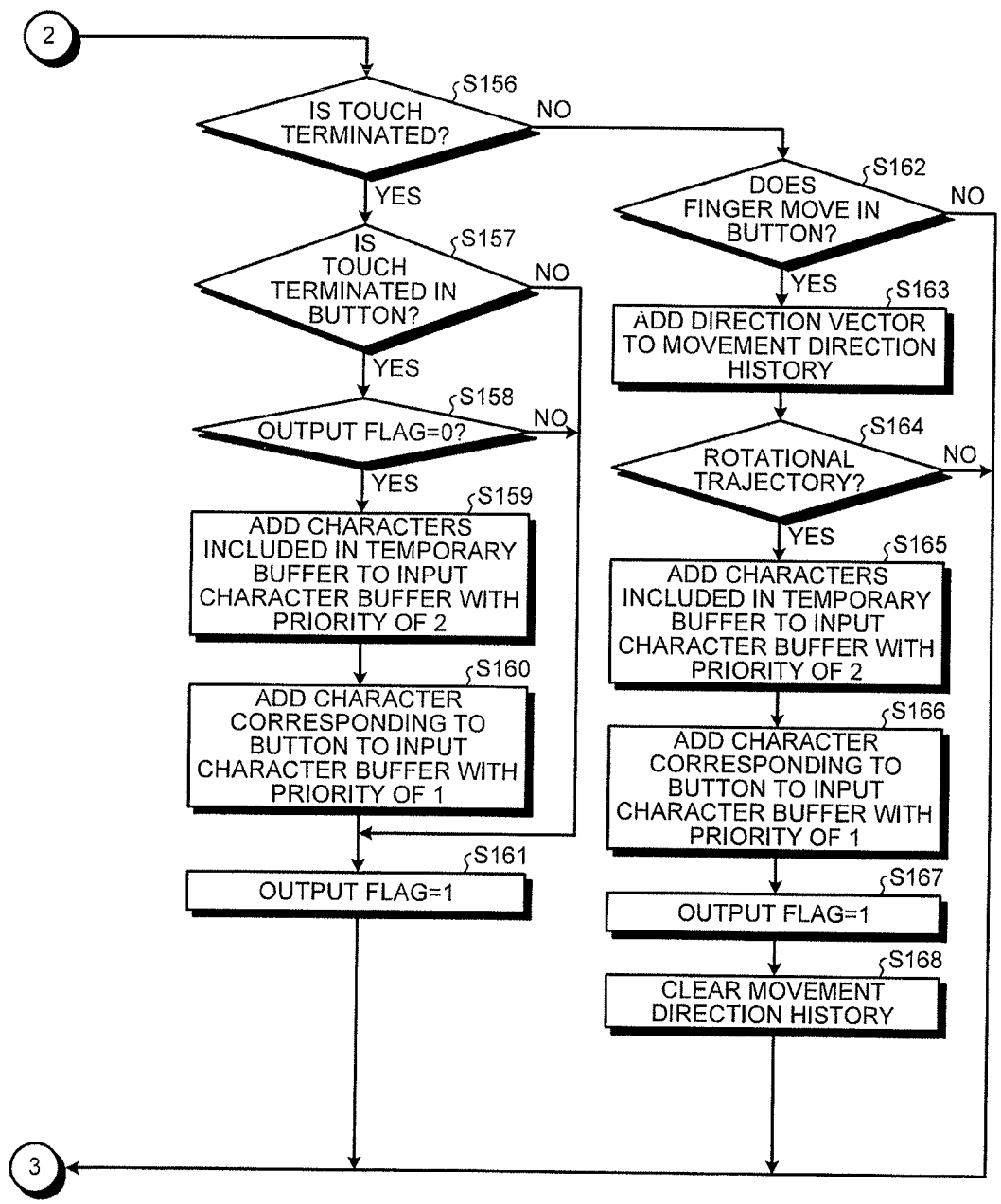

The character input determination processing performed at Step S117 in FIG. 11 will now be described with reference to flowcharts illustrated in FIGS. 15A and 15B. At Step S140, the control unit 10 determines whether the gesture detected on the touch panel 2 is a gesture of starting touch with the touch panel 2, that is, a gesture of bringing the finger into contact with the surface of the touch panel 2 based on the detection result of the touch panel 2.

If the gesture thus detected is the gesture of starting touch with the touch panel 2 (YES at Step S140), the control unit 10 compares the position where the touch is started with the virtual keyboard data 9D, and determines whether the position where the touch is started is in any one of the button areas at Step S141. If the position where the touch is started is in any one of the button areas (YES at Step S141), the button is assumed to be intentionally touched. Therefore, the control unit 10 adds a character corresponding to the button to the input character buffer 12 in a manner corresponding to priority "1" at Step S142. The character corresponding to the button is acquired from the virtual keyboard data 9D.

Subsequently, the control unit 10 sets an output flag to "1" at Step S143, and terminates the character input determination processing. The output flag is included in the RAM 11, and used for determining whether the character corresponding to the button displayed at the position with which the finger is touching has already been output to the input character buffer 12 or the temporary buffer 13. If the value of the output flag is "0", the character corresponding to the button displayed at the position with which the finger is touching is yet to be output to neither of the buffers. If the value of the output flag is "1", the character corresponding to the button displayed at the position with which the finger is touching has already been output to either of the buffers.

At Step S141, if the position where the touch is started is not in a button area (NO at Step S141), the control unit 10 terminates the character input determination processing without performing any processing in particular.

At Step S140, if the gesture detected on the touch panel 2 is not the gesture of starting touch with the touch panel 2 (NO at Step S140), the control unit 10 determines whether the gesture detected on the touch panel 2 is a gesture of moving the finger into a button area with the finger keeping the touch with the touch panel 2 based on the detection result of the touch panel 2 at Step S144. Whether the gesture thus detected is the gesture of moving the finger into the button area with the finger keeping the touch with the touch panel 2 is determined by comparing the position of touch indicated by the latest detection result of the touch panel 2 and the position of touch indicated by the detection result prior thereto with the virtual keyboard data 9D.

If the gesture thus detected is the gesture of moving the finger into the button area with the finger keeping the touch with the touch panel 2 (YES at Step S144), the control unit 10 clears a movement direction history at Step S145. The movement direction history is data in which a direction vector indicating which direction the finger moves in a specific area is recorded in chronological order, and is stored in the RAM 11.

Subsequently, at Step S146, the control unit 10 acquires a direction vector indicating the direction in which the finger enters the button area, and adds the direction vector thus acquired to the movement direction history. The control unit 10 then sets the output flag to "0" at Step S147, and terminates the character input determination processing.

If the detection result of the touch panel 2 includes information indicating the direction of movement of the finger, the direction vector is acquired from the detection result of the touch panel 2. If the detection result of the touch panel 2 includes no information indicating the direction of movement of the finger, the direction vector is calculated from the position of touch indicated by the latest detection result of the touch panel 2 and the position of touch indicated by the detection result prior thereto.

At Step S144, if the gesture detected on the touch panel 2 is not the gesture of moving the finger into the button area with the finger keeping the touch with the touch panel 2 (NO at Step S144), the control unit 10 determines whether the gesture detected on the touch panel 2 is a gesture of moving the finger out of a button with the finger keeping the touch with the touch panel 2 based on the detection result of the touch panel 2 at Step S148. Whether the gesture thus detected is the gesture of moving the finger out of the button with the finger keeping the touch with the touch panel 2 is determined by comparing the position of touch indicated by the latest detection result of the touch panel 2 and the position of touch indicated by the detection result prior thereto with the virtual keyboard data 9D.

If the gesture thus detected is the gesture of moving the finger out of the button with the finger keeping the touch with the touch panel 2 (YES at Step S148), the control unit 10 determines whether the output flag is "0" at Step S149. At this time, if the output flag is not "0", that is, if the character corresponding to the button in which the finger has been positioned is already output to either of the buffers (NO at Step S149), the control unit 10 terminates the character input determination processing without performing any processing in particular.

By contrast, if the output flag is "0" (YES at Step S149), the control unit 10 acquires the latest movement vector, that is, a direction vector indicating the direction in which the finger moves out of the button, and calculates the angular difference between the direction vector and a direction vector at the beginning of the movement direction history at Step S150. The angular difference calculated at this time represents the magnitude of difference between the direction in which the finger enters the button and the direction in which the finger leaves the button.

If the angular difference thus calculated is equal to or smaller than the predetermined threshold value (NO at Step S151), the finger is assumed to only pass across the button. Therefore, the control unit 10 adds the character corresponding to the button to the temporary buffer 13 at Step S152, and terminates the character input determination processing.

By contrast, if the angular difference thus calculated is larger than the predetermined threshold value (YES at Step S151), the button is assumed to be intentionally touched. Therefore, the control unit 10 performs a processing process subsequent to Step S153 such that the character corresponding to the button is stored in the input character buffer 12 together with characters corresponding to other buttons on the trajectory along which the finger moves in chronological order.

At Step S153, the control unit 10 adds the character(s) stored in the temporary buffer 13 to the input character buffer 12 in a manner corresponding to priority "2". Subsequently, at Step S154, the control unit 10 adds the character corresponding to the button to the input character buffer 12 in a manner corresponding to priority "1". The control unit 10 then clears the temporary buffer 13 at Step S155, and terminates the character input determination processing.

At Step S148, if the gesture detected on the touch panel 2 is not the gesture of moving the finger out of the button with the finger keeping the touch with the touch panel 2 (NO at Step S148), the control unit 10 determines whether the gesture detected on the touch panel 2 is a gesture of terminating the touch with the touch panel 2, that is, a gesture of pulling the finger away from the touch panel 2 based on the detection result of the touch panel 2 at Step S156.

If the gesture thus detected is the gesture of terminating the touch with the touch panel 2 (YES at Step S156), the control unit 10 compares the position where the touch is terminated with the virtual keyboard data 9D, and determines whether the position where the touch is terminated is in any one of the button areas at Step S157. If the position where the touch is terminated is in any one of the button areas (YES at Step S157), the button is assumed to be intentionally touched. Therefore, the control unit 10 performs a processing process subsequent to Step S158 such that the character corresponding to the button is stored in the input character buffer 12 together with characters corresponding to other buttons on the trajectory along which the finger moves in chronological order.

At Step S158, the control unit 10 determines whether the output flag is "0". At this time, if the output flag is "0", that is, if the character corresponding to the button assumed to be intentionally touched is yet to be output to neither of the buffers (YES at Step S158), the control unit 10 adds the character(s) stored in the temporary buffer 13 to the input character buffer 12 in a manner corresponding to priority "2" at Step S159. Subsequently, the control unit 10 adds the character corresponding to the button to the input character buffer 12 in a manner corresponding to priority "1" at Step S160.

The fact that the gesture of terminating the touch with the touch panel 2 is made indicates that the input of characters at a time is completed. Therefore, the control unit 10 sets the input completion flag to "1" at Step S161, and terminates the character input determination processing.

If the position where the touch is terminated is not in a button area (NO at Step S157), or if the output flag is not "0" (NO at Step S158), the control unit 10 performs processing for setting the input completion flag to "1" alone at Step S161, and terminates the character input determination processing.

If the position where the touch is terminated is not in a button area, or if the output flag is not "0", the character stored in the temporary buffer 13 may be added to the input character buffer 12 in a manner corresponding to priority "2".

At Step S156, if the gesture detected on the touch panel 2 is not the gesture of terminating the touch with the touch panel 2 (NO at Step S156), the control unit 10 determines whether the gesture detected on the touch panel 2 is a gesture of moving the finger in a button area with the finger keeping the touch with the touch panel 2 based on the detection result of the touch panel 2 at Step S162.

If the gesture thus detected is the gesture of moving the finger in the button area with the finger keeping the touch with the touch panel 2 (YES at Step S162), the control unit 10 acquires a direction vector indicating the direction in which the finger moves in the button area, and adds the direction vector thus acquired to the movement direction history at Step S163. The control unit 10 then refers to each direction vector recorded in the movement direction history, and determines whether the finger moves to draw a rotational trajectory in the button area while keeping the touch with the touch panel 2 at Step S164.

At this time, if the finger moves to draw a rotational trajectory in the button area while keeping the touch with the touch panel 2 (YES at Step S164), the button is assumed to be intentionally touched. Therefore, the control unit 10 performs a processing process subsequent to Step S165 such that the character corresponding to the button is stored in the input character buffer 12 together with characters corresponding to other buttons on the trajectory along which the finger moves in chronological order.

At Step S165, the control unit 10 adds the character(s) stored in the temporary buffer 13 to the input character buffer 12 in a manner corresponding to priority "2". Subsequently, at Step S166, the control unit 10 adds the character corresponding to the button to the input character buffer 12 in a manner corresponding to priority "1". The control unit 10 then sets the output flag to "1" at Step S167, clears the movement direction history at Step S168, and terminates the character input determination processing.

At Step S162, if the gesture detected on the touch panel 2 is not the gesture of moving the finger in the button area with the finger keeping the touch with the touch panel 2, that is, if the finger moves outside the button on the virtual keyboard 4 (NO at Step S162), the control unit 10 terminates the character input determination processing without performing any processing in particular.

Figure 16:
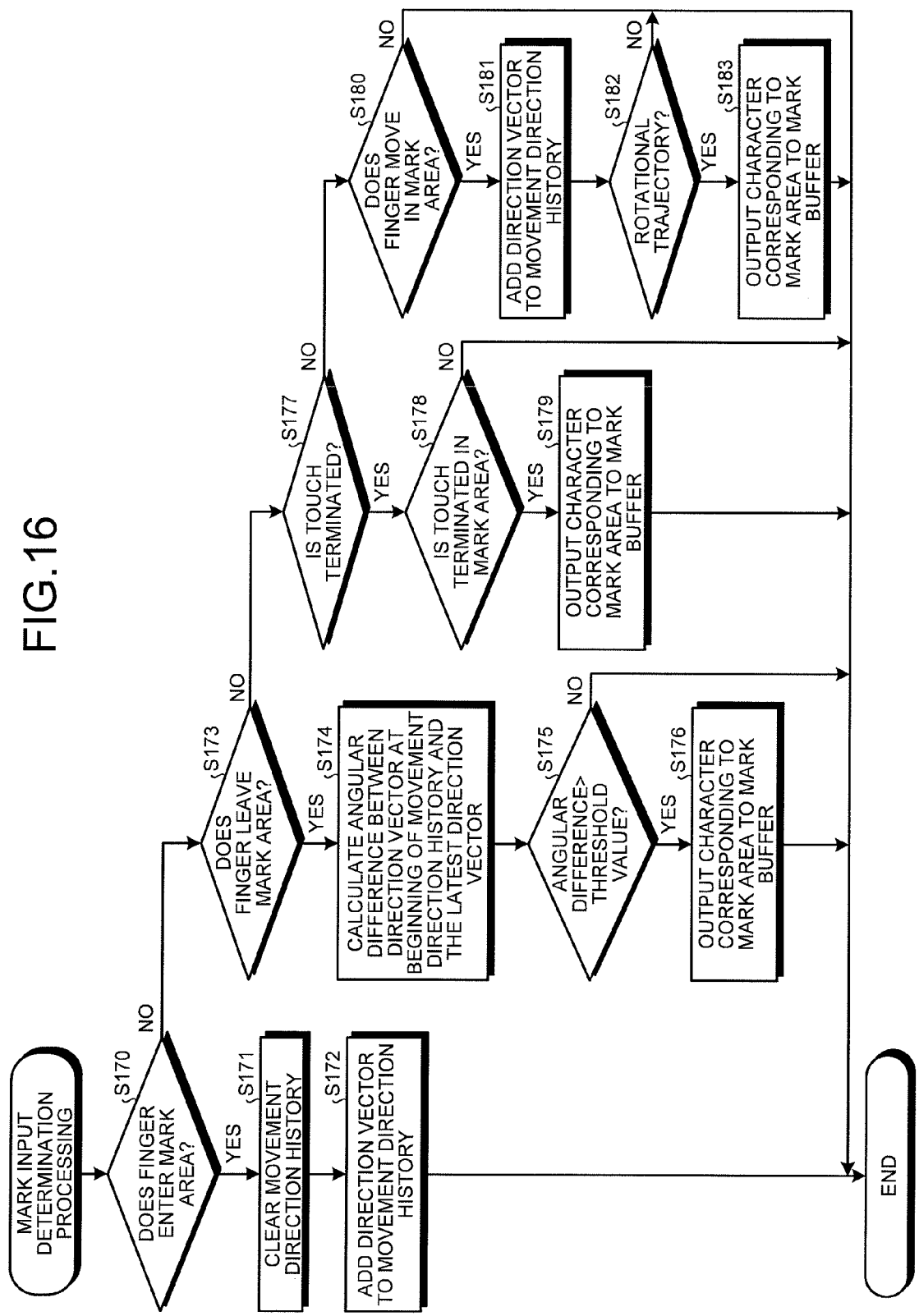
FIG. 16 is a flowchart illustrating a processing process of mark input determination processing.

The mark input determination processing performed at Step S118 in FIG. 11 will now be described with reference to a flowchart illustrated in FIG. 16. At Step S170, the control unit 10 determines whether the gesture detected on the touch panel 2 is a gesture of moving the finger into the mark area 15 with the finger keeping the touch with the touch panel 2 based on the detection result of the touch panel 2. Whether the gesture thus detected is the gesture of moving the finger into the mark area 15 with the finger keeping the touch with the touch panel 2 is determined by comparing the position of touch indicated by the latest detection result of the touch panel 2 and the position of touch indicated by the detection result prior thereto with position information (e.g., the top-left coordinate, the width, and the height) of the mark area 15 specified in advance.

If the gesture thus detected is the gesture of moving the finger into the mark area 15 with the finger keeping the touch with the touch panel 2 (YES at Step S170), the control unit 10 clears the movement direction history at Step S171. At Step S172, the control unit 10 acquires a direction vector indicating the direction in which the finger enters the mark area 15, and adds the direction vector thus acquired to the movement direction history. The control unit 10 then terminates the mark input determination processing.

At Step S170, if the gesture detected on the touch panel 2 is not the gesture of moving the finger into the mark area 15 with the finger keeping the touch with the touch panel 2 (NO at Step S170), the control unit 10 determines whether the gesture detected on the touch panel 2 is a gesture of moving the finger out of the mark area 15 with the finger keeping the touch with the touch panel 2 based on the detection result of the touch panel 2 at Step S173. Whether the gesture thus detected is the gesture of moving the finger out of the mark area 15 with the finger keeping the touch with the touch panel 2 is determined by comparing the position of touch indicated by the latest detection result of the touch panel 2 and the position of touch indicated by the detection result prior thereto with the position information of the mark area 15.

If the gesture thus detected is the gesture of moving the finger out of the button with the finger keeping the touch with the touch panel 2 (YES at Step S173), the control unit 10 acquires the latest movement vector, that is, a direction vector indicating the direction in which the finger moves out of the mark area 15, and calculates the angular difference between the direction vector and a direction vector at the beginning of the movement direction history at Step S174. The angular difference calculated at this time represents the magnitude of difference between the direction in which the finger enters the mark area 15 and the direction in which the finger leaves the mark area 15.

If the angular difference thus calculated is equal to or smaller than the predetermined threshold value (NO at Step S175), the finger is assumed to only pass across the mark area 15. Therefore, the control unit 10 terminates the mark input determination processing without performing any processing in particular.

By contrast, if the angular difference thus calculated is larger than the predetermined threshold value (YES at Step S175), the mark area 15 is assumed to be intentionally touched. Therefore, the control unit 10 stores the character corresponding to the mark area 15 in the mark buffer at Step S176, and terminates the mark input determination processing.

At Step S173, if the gesture detected on the touch panel 2 is not the gesture of moving the finger out of the mark area 15 with the finger keeping the touch with the touch panel 2 (NO at Step S173), the control unit 10 determines whether the gesture detected on the touch panel 2 is a gesture of terminating the touch with the touch panel 2, that is, a gesture of pulling the finger away from the touch panel 2 based on the detection result of the touch panel 2 at Step S177.

If the gesture thus detected is the gesture of terminating the touch with the touch panel 2 (YES at Step S177), the control unit 10 compares the position where the touch is terminated with the position information of the mark area 15, and determines whether the position where the touch is terminated is in either of the mark areas 15 at Step S178. If the position where the touch is terminated is in neither of the mark areas 15 (NO at Step S178), the control unit 10 terminates the mark input determination processing without performing any processing in particular.

By contrast, if the position where the touch is terminated is in either of the mark areas 15 (YES at Step S178), the mark area 15 is assumed to be intentionally touched. Therefore, the control unit 10 stores the character corresponding to the mark area 15 in the mark buffer at Step S179, and terminates the mark input determination processing.

At Step S177, if the gesture detected on the touch panel 2 is not the gesture of terminating the touch with the touch panel 2 (NO at Step S177), the control unit 10 determines whether the gesture detected on the touch panel 2 is a gesture of moving the finger in the mark area 15 with the finger keeping the touch with the touch panel 2 based on the detection result of the touch panel 2 at Step S180.

If the gesture thus detected is the gesture of moving the finger in the mark area 15 with the finger keeping the touch with the touch panel 2 (YES at Step S180), the control unit 10 acquires a direction vector indicating the direction in which the finger moves in the mark area 15, and adds the direction vector thus acquired to the movement direction history at Step S181. The control unit 10 then refers to each direction vector recorded in the movement direction history, and determines whether the finger moves to draw a rotational trajectory in the mark area 15 while keeping the touch with the touch panel 2 at Step S182.

At this time, if the finger moves to draw a rotational trajectory in the mark area 15 while keeping the touch with the touch panel 2 (YES at Step S182), the mark area 15 is assumed to be intentionally touched. Therefore, the control unit 10 stores the character corresponding to the mark area 15 in the mark buffer at Step S183, and terminates the mark input determination processing.

If the gesture detected on the touch panel 2 is not the gesture of moving the finger in the mark area 15 with the finger keeping the touch with the touch panel 2 at Step S180 (NO at Step S180), or if the finger moves not to draw a rotational trajectory in the mark area 15 while keeping the touch with the touch panel 2 at Step S182 (NO at Step S182), the control unit 10 terminates the mark input determination processing without performing any processing in particular.

Figure 17:
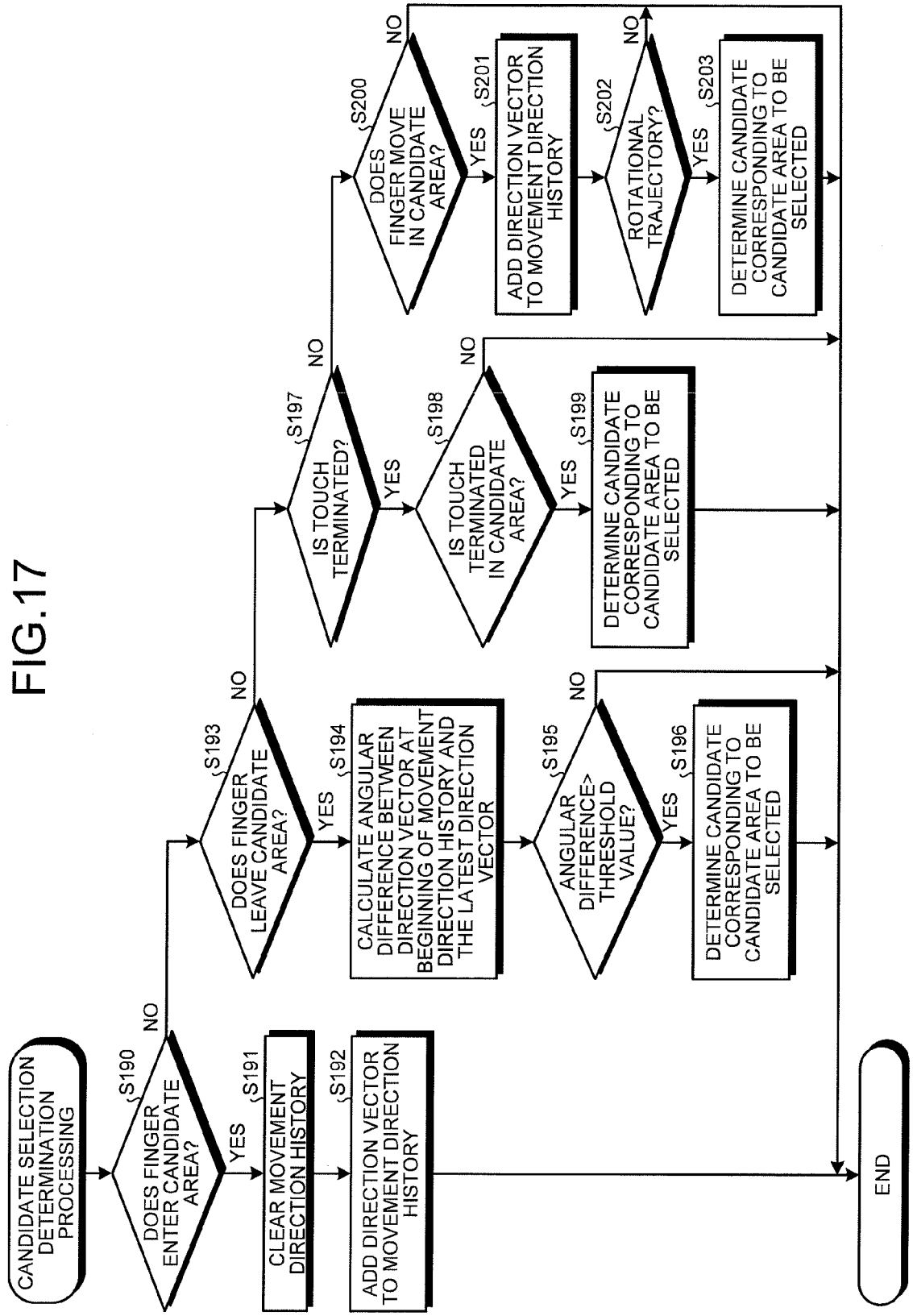
FIG. 17 is a flowchart illustrating a processing process of candidate selection determination processing.

The candidate selection determination processing performed at Step S115 in FIG. 11 and Step S132 in FIG. 12 will now be described with reference to a flowchart illustrated in FIG. 17. At Step S190, the control unit 10 determines whether the gesture detected on the touch panel 2 is a gesture of moving the finger into a candidate area with the finger keeping the touch with the touch panel 2 based on the detection result of the touch panel 2.

The candidate area used herein means an area in which each candidate is displayed in the input character string candidate display area 14, and corresponds to the minimum rectangle surrounding each candidate. Whether the gesture thus detected is the gesture of moving the finger into the candidate area with the finger keeping the touch with the touch panel 2 is determined by comparing the position of touch indicated by the latest detection result of the touch panel 2 and the position of touch indicated by the detection result prior thereto with position information (e.g., the top-left coordinate, the width, and the height) of the candidate area determined when each candidate is displayed.

If the gesture thus detected is the gesture of moving the finger into the candidate area with the finger keeping the touch with the touch panel 2 (YES at Step S190), the control unit 10 clears the movement direction history at Step S191. At Step S192, the control unit 10 acquires a direction vector indicating the direction in which the finger enters the candidate area, and adds the direction vector thus acquired to the movement direction history. The control unit 10 then terminates the candidate selection determination processing.

At Step S190, if the gesture detected on the touch panel 2 is not the gesture of moving the finger into the candidate area with the finger keeping the touch with the touch panel 2 (NO at Step S190), the control unit 10 determines whether the gesture detected on the touch panel 2 is a gesture of moving the finger out of the candidate area with the finger keeping the touch with the touch panel 2 based on the detection result of the touch panel 2 at Step S193. Whether the gesture thus detected is the gesture of moving the finger out of the candidate area with the finger keeping the touch with the touch panel 2 is determined by comparing the position of touch indicated by the latest detection result of the touch panel 2 and the position of touch indicated by the detection result prior thereto with the position information of the candidate area.

If the gesture thus detected is the gesture of moving the finger out of the candidate area with the finger keeping the touch with the touch panel 2 (YES at Step S193), the control unit 10 acquires the latest movement vector, that is, a direction vector indicating the direction in which the finger moves out of the candidate area, and calculates the angular difference between the direction vector and a direction vector at the beginning of the movement direction history at Step S194. The angular difference calculated at this time represents the magnitude of difference between the direction in which the finger enters the candidate area and the direction in which the finger leaves the candidate area.

If the angular difference thus calculated is equal to or smaller than the predetermined threshold value (NO at Step S195), the finger is assumed to only pass across the candidate area. Therefore, the control unit 10 terminates the candidate selection determination processing without performing any processing in particular.

By contrast, if the angular difference thus calculated is larger than the predetermined threshold value (YES at Step S195), the candidate area is assumed to be intentionally touched. Therefore, the control unit 10 determines that the candidate corresponding to the candidate area is selected at Step S196, and terminates the candidate selection determination processing.

At Step S193, if the gesture detected on the touch panel 2 is not the gesture of moving the finger out of the candidate area with the finger keeping the touch with the touch panel 2 (NO at Step S193), the control unit 10 determines whether the gesture detected on the touch panel 2 is a gesture of terminating the touch with the touch panel 2, that is, a gesture of pulling the finger away from the touch panel 2 based on the detection result of the touch panel 2 at Step S197.

If the gesture thus detected is the gesture of terminating the touch with the touch panel 2 (YES at Step S197), the control unit 10 compares the position where the touch is terminated with the position information of the candidate area, and determines whether the position where the touch is terminated is in any one of the candidate areas at Step S198. If the position where the touch is terminated is in none of the candidate areas (NO at Step S198), the control unit 10 terminates the candidate selection determination processing without performing any processing in particular.

By contrast, if the position where the touch is terminated is in any one of the candidate areas (YES at Step S198), the candidate area is assumed to be intentionally touched. Therefore, the control unit 10 determines that the candidate corresponding to the candidate area is selected at Step S199, and terminates the candidate selection determination processing.

At Step S197, if the gesture detected on the touch panel 2 is not the gesture of terminating the touch with the touch panel 2 (NO at Step S197), the control unit 10 determines whether the gesture detected on the touch panel 2 is a gesture of moving the finger in the candidate area with the finger keeping the touch with the touch panel 2 based on the detection result of the touch panel 2 at Step S200.

If the gesture thus detected is the gesture of moving the finger in the candidate area with the finger keeping the touch with the touch panel 2 (YES at Step S200), the control unit 10 acquires a direction vector indicating the direction in which the finger moves in the candidate area, and adds the direction vector thus acquired to the movement direction history at Step S201. The control unit 10 then refers to each direction vector recorded in the movement direction history, and determines whether the finger moves to draw a rotational trajectory in the candidate area while keeping the touch with the touch panel 2 at Step S202.

At this time, if the finger moves to draw a rotational trajectory in the candidate area while keeping the touch with the touch panel 2 (YES at Step S202), the candidate area is assumed to be intentionally touched. Therefore, the control unit 10 determines that the candidate corresponding to the candidate area is selected at Step S203, and terminates the candidate selection determination processing.

If the gesture detected on the touch panel 2 is not the gesture of moving the finger in the candidate area with the finger keeping the touch with the touch panel 2 at Step S200 (NO at Step S200), or if the finger moves not to draw a rotational trajectory in the candidate area while keeping the touch with the touch panel 2 at Step S202 (NO at Step S202), the control unit 10 terminates the candidate selection determination processing without performing any processing in particular.

Figure 18:
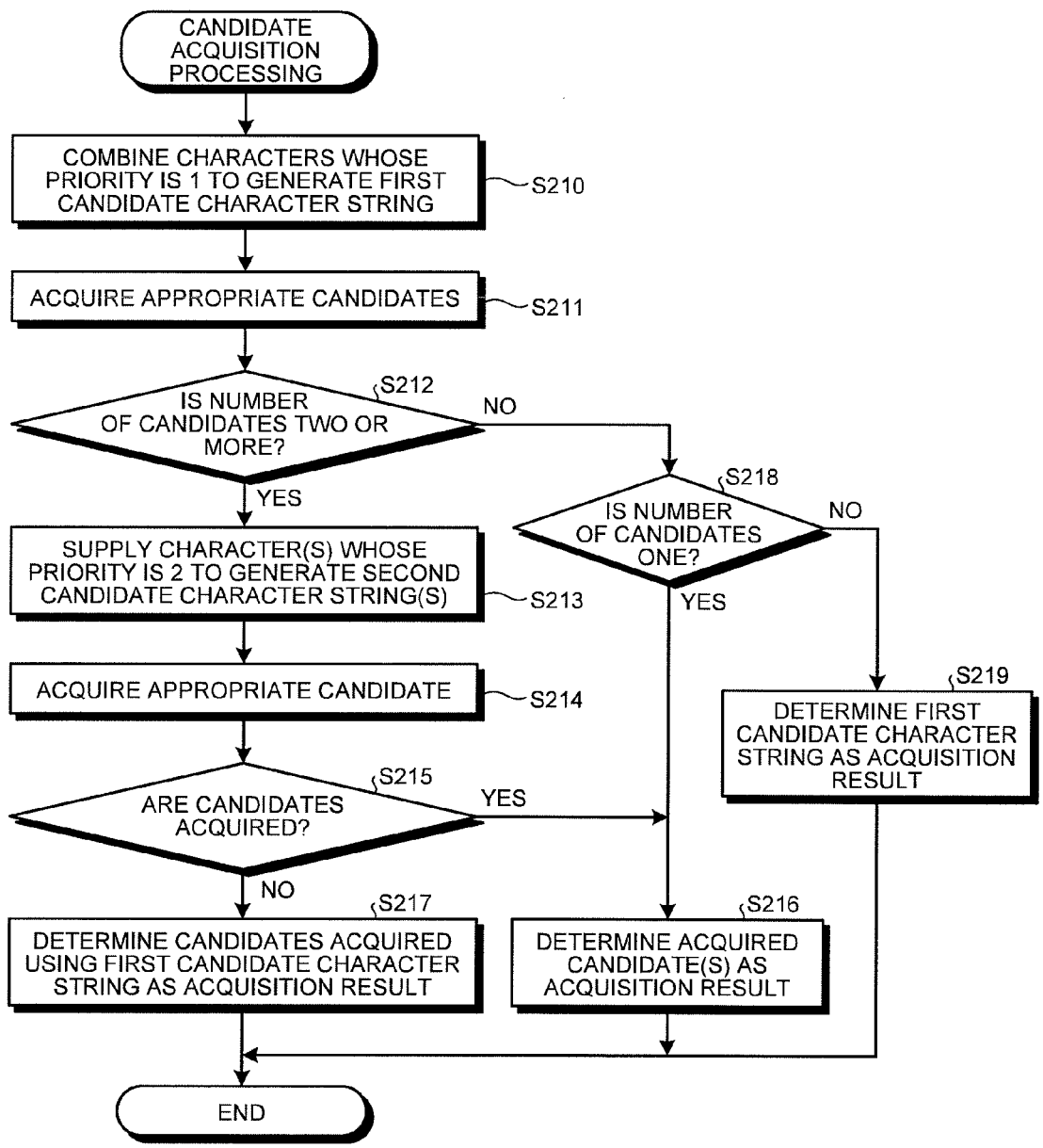
FIG. 18 is a flowchart illustrating a processing process of candidate acquisition processing.

The candidate acquisition processing performed at Step S125 in FIG. 11 and Step S127 in FIG. 12 will now be described with reference to a flowchart illustrated in FIG. 18. At Step S210, the control unit 10 acquires characters whose priority is "1" from the input character buffer 12, and combines the characters thus acquired to generate a first candidate character string.

For example, an assumption is made that four characters of "A", "B", "C", and "D" are stored in the input character buffer 12 in this order, and that the priority of "A" and "D" is "1", and the priority of "B" and "C" is "2". In this case, the control unit 10 combines the characters whose priority is "1" in order of being stored, and generates a first candidate character string "AD".

Subsequently, at Step S211, the control unit 10 performs prediction processing or conversion processing to acquire candidate(s) of the input character string from the first candidate character string. The prediction processing herein means processing for predicting a character string intended to be input by the user from the character string that is being input. The conversion processing herein means, for example, processing for converting a character string input as a combination of alphanumeric characters into kanji or kana.

An example of the prediction processing will be described. If the first candidate character string is "ABC", for example, a character string that matches a pattern of "A*B*C" is searched from the dictionary data 9E so as to acquire a candidate of the input character string. Note that "*" used herein is a wild card that matches an arbitrary character. In other words, in this example, a character string whose leading character is identical to that of the first candidate character string, and in which each character subsequent to the leading character of the first candidate character string appears in the same order as that of the first candidate character string with characters of more than zero interposed therebetween is searched as a character string that matches the first candidate character string.

By performing the matching in this manner, it is possible to raise the possibility of identifying the input character string properly even if a button failed to be determined to be intentionally touched by the finger.

If a plurality of character strings are acquired as candidates of the input character string (YES at Step S212), in order to narrow down the candidates, the control unit 10 acquires character(s) whose priority is "2" from the input character buffer 12, and supplies the first candidate character string with the character(s) thus acquired, thereby generating one or more second candidate character strings at Step S213.

Similarly to the example described above, for example, an assumption is made that four characters of "A", "B", "C", and "D" are stored in the input character buffer 12 in this order, and that the priority of "A" and "D" is "1", and the priority of "B" and "C" is "2". In this case, the control unit 10 supplies "AB" serving as the first candidate character string with at least one of the characters whose priority is "2" while observing the order of being stored, thereby generating three second candidate character strings of "ABD", "ACD", and "ABCD".

Subsequently, at Step S214, the control unit 10 performs the prediction processing or the conversion processing to acquire candidate(s) of the input character string from the second candidate character string(s).

At Step S214, if character string(s) are acquired as the candidate of the input character string (YES at Step S215), the control unit 10 determines the character string thus acquired as the acquisition result at Step S216, and terminates the candidate acquisition processing. By contrast, if no character string is acquired at Step S214 (NO at Step S215), the control unit 10 determines the candidates of the input character string acquired using the first candidate character string at Step S211 as the acquisition result at Step S217, and terminates the candidate acquisition processing.

If one character string alone is acquired as the candidate of the input character string at Step S211 (NO at Step S212 and YES at Step S218), the control unit 10 determines the character string thus acquired as the acquisition result at Step S216, and terminates the candidate acquisition processing. If no character string is acquired as the candidate of the input character string at Step S211 (NO at Step S218), the control unit 10 determines the first candidate character string, that is, the character string obtained by combining the characters whose priority is "1" in order of being stored as the acquisition result at Step S219, and terminates the candidate acquisition processing.

As described above, the mobile phone terminal 1 makes it possible to input characters by moving the finger on the virtual keyboard without pulling the finger away from the touch panel 2, and to select an input candidate without pulling the finger away from the touch panel 2. Accordingly, the mobile phone terminal 1 allows the user to input characters at high speed.

The configuration of the mobile phone terminal 1 can be changed arbitrarily without departing from the spirit and scope of the present invention. In the present embodiment, for example, "1" or "2" is assigned as priority to a character corresponding to each button on the trajectory along which the finger moves without being away from the touch panel 2. However, the priority assigned to the characters may be further fractionized.

For example, "1" may be assigned as priority to a character corresponding to a button determined to be intentionally touched, and any one of "2" to "5" may be assigned as priority to a character corresponding to a button determined to be a button across which the finger only passes.

In this case, for example, for the character corresponding to the button determined to be a button across which the finger only passes, higher priority may be assigned to the character as the angular difference between the movement direction in which the finger enters the button and the movement direction in which the finger leaves the button is larger. This is because the larger the angular difference is, the more likely it is that the button is intentionally touched.

Furthermore, for the character corresponding to the button determined to be a button across which the finger only passes, higher priority may be assigned to the character as the trajectory along which the finger moves is positioned closer to the center of the button. This is because the closer to the center of the button the trajectory along which the finger moves is, the more likely it is that the button is intentionally touched.

If the priority is fractionized in this manner, the character having higher priority is used preferentially when the second candidate character string is created in the candidate acquisition processing. Specifically, if a plurality of character strings match the first candidate character string obtained by combining the characters whose priority is "1", the first candidate character string is supplied with the character whose priority is "2" so as to narrow down the search result. If a plurality of character strings still match the first candidate character string to which the character whose priority is "2" is supplied, the first candidate character string is further supplied with the character whose priority is "3" so as to narrow down the search result.

In the same manner hereinafter, the characters are used for the supplement in order of having higher priority until the search result is narrowed down to one character string. Fractionizing the priority in this manner makes it possible to generate a character string to be verified by combining the characters in order of being likely to be intentionally touched. Accordingly, the identification accuracy of the input character string can be improved.

In the character input processing explained with reference to FIG. 11 and FIG. 12, every time the control unit 10 acquires a new detection result from the touch panel 2, the control unit 10 acquires a candidate of the input character string, and displays the candidate in the input character string candidate display area 14. However, the control unit 10 may not perform such display until input of characters at a time is completed. After the input of characters at a time is completed, only when a plurality of character strings are acquired as candidates of the input character string in the candidate acquisition processing, the control unit 10 may display the character strings thus retrieved in the input character string candidate display area 14.

For the conversion processing in the candidate acquisition processing explained with reference to FIG. 18, another matching method such as a prefix search may be employed. Furthermore, in the prediction processing, a character string intended to be input by the user may be predicted from character strings that have already been input and a character string that is being input based on the strength of combination of the character string, the frequency of use thereof, and the like.

In the prediction processing and the conversion processing performed in the candidate acquisition processing explained with reference to FIG. 18, as illustrated in the example of FIG. 19, if a specific gesture is detected in the mark area 15, the most likely candidate of the input character string at that time may be received as an input character. At this time, a mark corresponding to the mark area 15 in which the specific gesture is detected may further be received as an input character. In the example illustrated in FIG. 19, for example, among a plurality of candidates corresponding to "KI" input by the consecutive method at s31 and s32, a candidate C10 ("KI") that is the most likely candidate of the input character string is highlighted in the text input area 16 as a temporary value. In this state, if a gesture of the finger changing the direction of movement in the mark area 15A while keeping the touch with the touch panel 2 is detected at s33, the candidate C10 is received as the input character. Furthermore, a comma that is the mark corresponding to the mark area 15A is received as the input character.

In the embodiment, among characters corresponding to buttons displayed on the trajectory along which the finger moves while keeping the touch with the touch panel 2, a character corresponding to a button displayed at a position where a specific gesture is detected is prioritized to identify the input character string. However, the present invention is not limited thereto. In other words, a character string including a character corresponding to a button on the trajectory along which the finger moves while keeping the touch with the touch panel 2, or a button displayed in the vicinity thereof may be received as the input character string.

In the embodiment, the gesture of keeping the touch with the touch panel 2 in the button area, the gesture of pulling the finger away from the touch panel 2 in the button area, and other gestures are described as the specific gesture. However, these gestures are just examples of the specific gesture, and another gesture may be treated as the specific gesture.

The invention claimed is:

1. A character input device, comprising:
a display configured to display a candidate area, a text area, and a keyboard area including a plurality of buttons;
a touch sensor configured to detect a touch gesture with respect to the display; and
a control unit configured to control the display to display the keyboard area, and
when the touch sensor detects a touch gesture in which a touch is started at a first position in the keyboard area and is maintained to a second position in the keyboard area, candidate character strings in the candidate area on the display as candidates of a character string input by the touch gesture, wherein
the candidate character strings displayed in the candidate area are obtained by prediction processing or conversion processing based on characters corresponding to buttons on a trajectory of the touch gesture from the first position to the second position, while the touch is maintained in the keyboard area, and
when the touch sensor detects the touch gesture in which the touch is started at the first position, continuously maintained to the second position, and further continuously maintained to the candidate area, and when a specific curved gesture, which is performed while the touch is maintained in the candidate area, is detected on one of the candidate character strings, the control unit is configured to control the display to display the one candidate character string in the text area as input text.

2. The character input device according to claim 1, wherein the specific gesture is a touch gesture in which a direction of movement of the touch is changed.

3. The character input device according to claim 1, wherein the touch gesture is a gesture in which a movement of the touch draws the trajectory of a specific shape that is a rotational trajectory around a character.

4. The character input device according to claim 1, wherein the control unit is configured to convert the character string input by the touch gesture into kanji by the conversion processing.

5. The character input device according to claim 1, wherein, the control unit is configured to, when the touch started at the first position and maintained to the second position is further maintained to a previously specified mark area of the display, and when the specific gesture is detected in the mark area,
receive one of the candidate character strings obtained by the prediction processing or the conversion processing as the character string input by the touch gesture, and
further receive a mark corresponding to the mark area as a character thus input.

6. The character input device according to claim 1, wherein the touch gesture includes a first section for inputting the character string and a second section for selecting one of the candidate character strings.

7. The character input device according to claim 1, wherein the candidate area is outside the keyboard area, and
the candidate character strings do not overlap the keyboard area.

8. The character input device according to claim 7, wherein the candidate area is outside the text area, and
the candidate character strings do not overlap the text area.

* * * * *